(12) United States Patent
Hu

(10) Patent No.: US 10,455,354 B2
(45) Date of Patent: Oct. 22, 2019

(54) SYSTEMS AND METHODS FOR REAL-TIME USER ENGAGEMENT AND INTERACTIONS

(71) Applicant: Peng Hu, Toronto (CA)

(72) Inventor: Peng Hu, Toronto (CA)

( * ) Notice: Subject to any disclaimer, the term of this patent is extended or adjusted under 35 U.S.C. 154(b) by 0 days.

(21) Appl. No.: 16/138,616

(22) Filed: Sep. 21, 2018

(65) Prior Publication Data

US 2019/0098445 A1 Mar. 28, 2019

Related U.S. Application Data

(60) Provisional application No. 62/561,809, filed on Sep. 22, 2017.

(51) Int. Cl.
*H04W 4/021* (2018.01)
*H04W 4/33* (2018.01)
*H04W 4/024* (2018.01)

(52) U.S. Cl.
CPC ........... *H04W 4/021* (2013.01); *H04W 4/024* (2018.02); *H04W 4/33* (2018.02)

(58) Field of Classification Search
CPC ...................................... H04W 4/021
USPC .................................................. 455/456.3
See application file for complete search history.

(56) References Cited

U.S. PATENT DOCUMENTS 10,210,475 B2 * 2/2019 Pargoe ............... G06Q 10/0836

* cited by examiner

*Primary Examiner* — Joel Ajayi

(57) ABSTRACT

Systems and methods for real-time user engagement, interactions, and management for various events. A beacon device, either a standalone beacon tag or a part of a user device, is able to interact with a gateway and/or a server. The systems and methods are used for enhancing and optimizing user experience in terms of, for example, obtaining location information of the beacon/user devices, providing location-based services, notifying users of event activities, simplifying distribution and viewing of promotional or services data, and facilitating the interactions and communication between users in different roles (such as visitors/attendees, patrons, sponsors, exhibitors, organizers, event service providers, property management users, and business users) in a venue for an event; facilitating the collection and processing of business or user information and follow-up communications after the event; and managing the data regarding locations, maps, events, users, leads, security, configurations, devices, user applications, and promotion data.

20 Claims, 10 Drawing Sheets

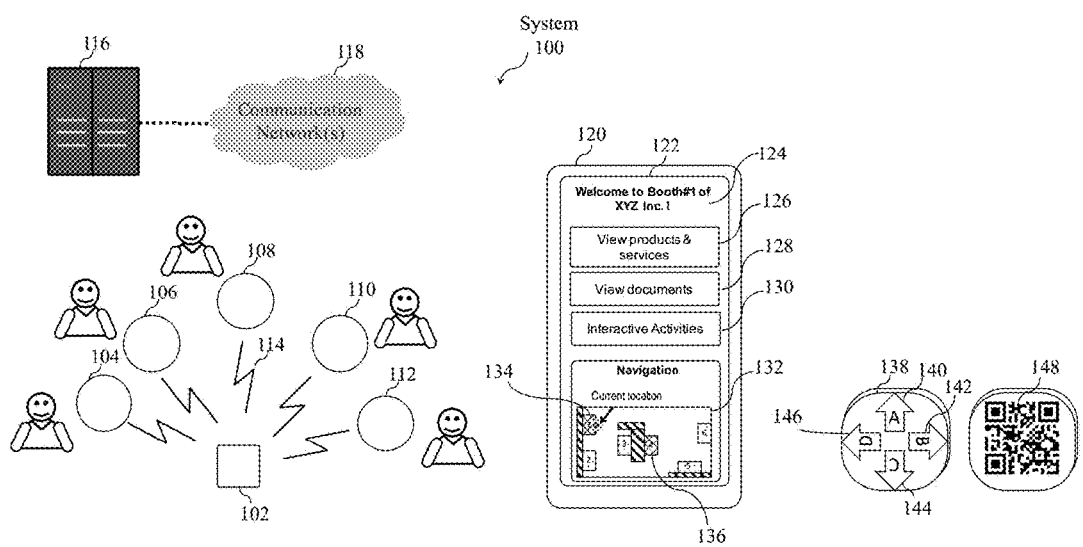
FIG. 1.1
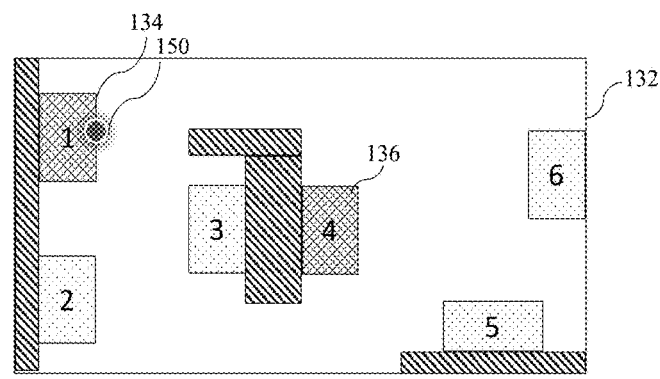
FIG. 1.2

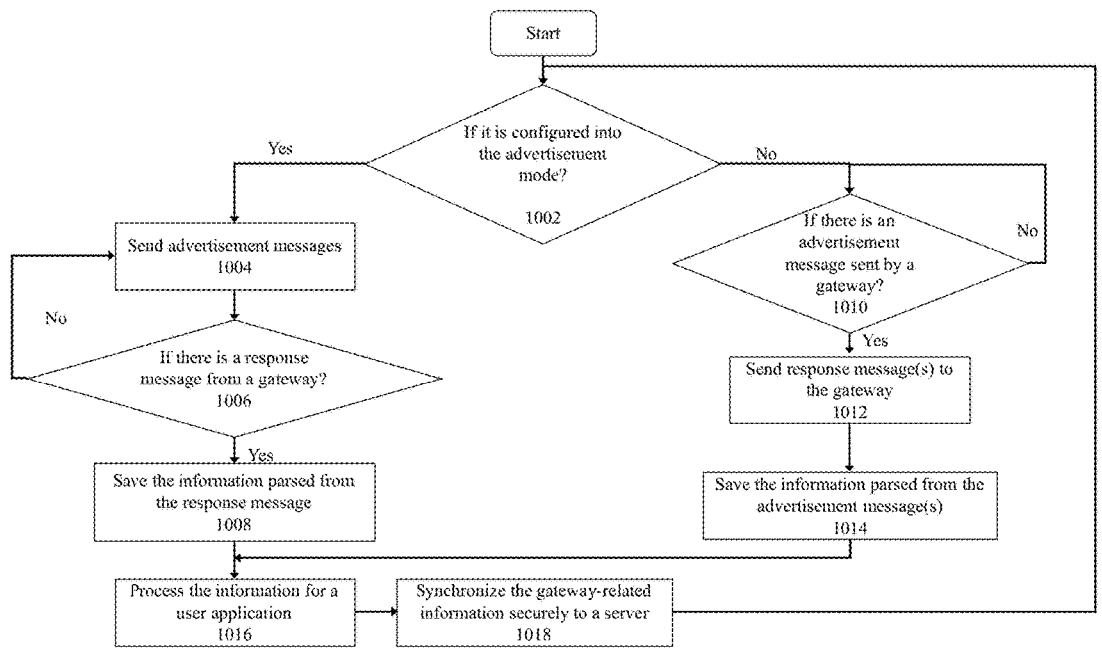
FIG. 10
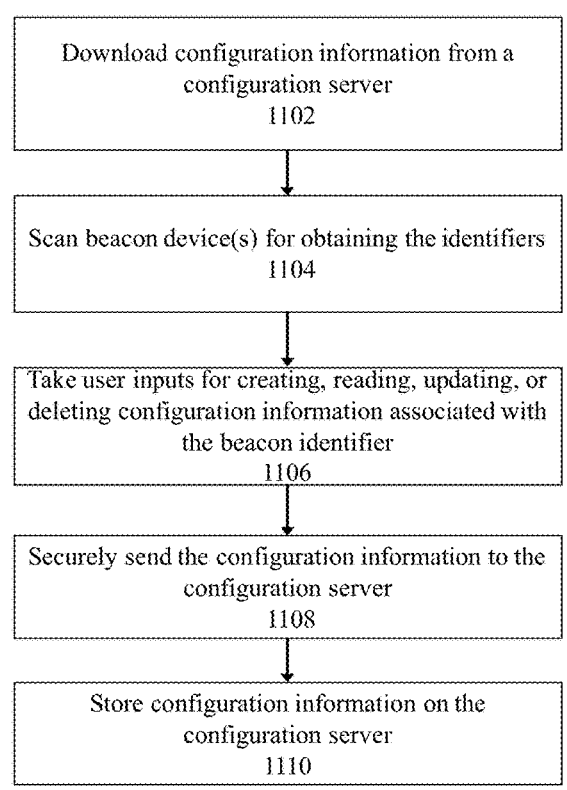
FIG. 11.1

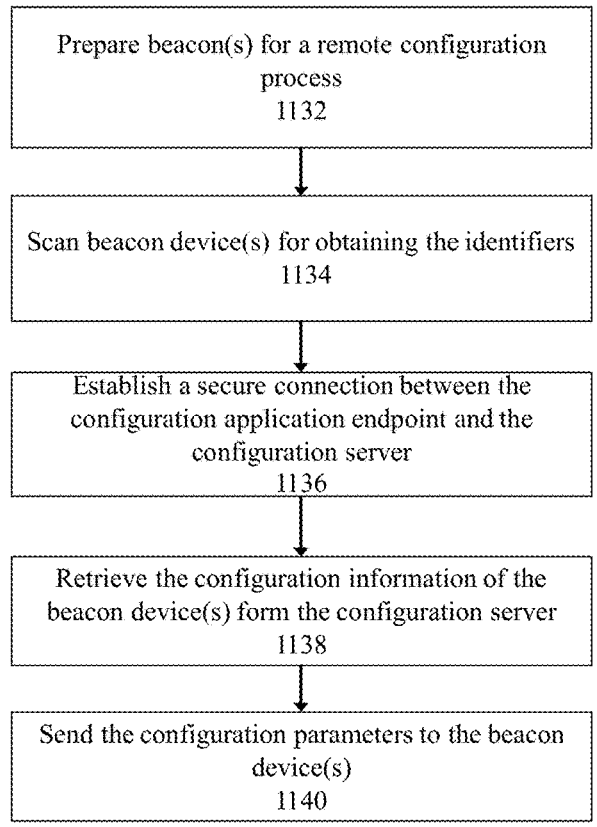
FIG. 11.2
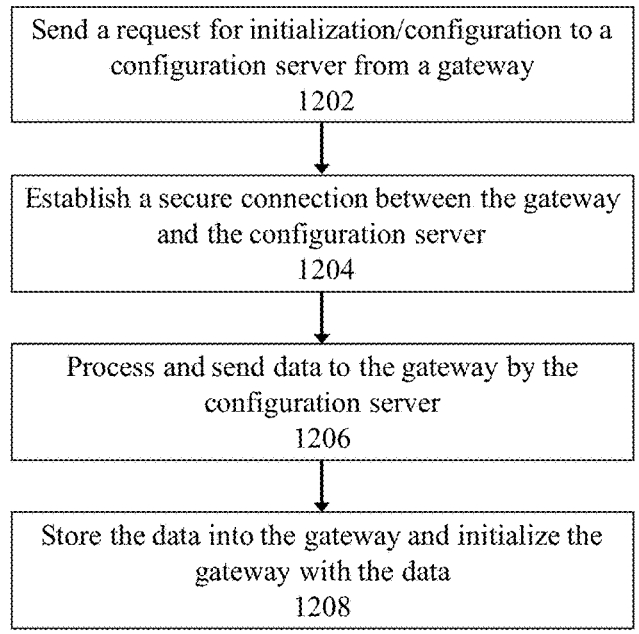
FIG. 12

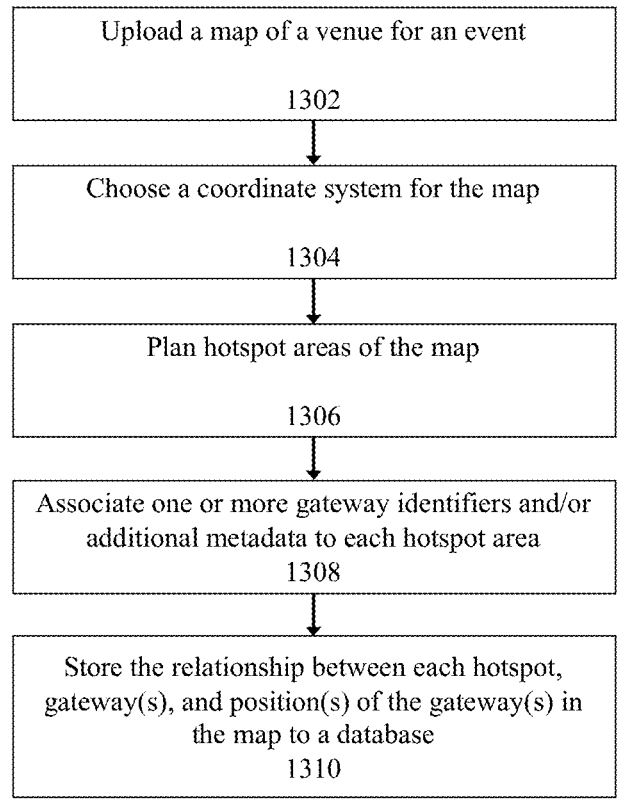
FIG. 13
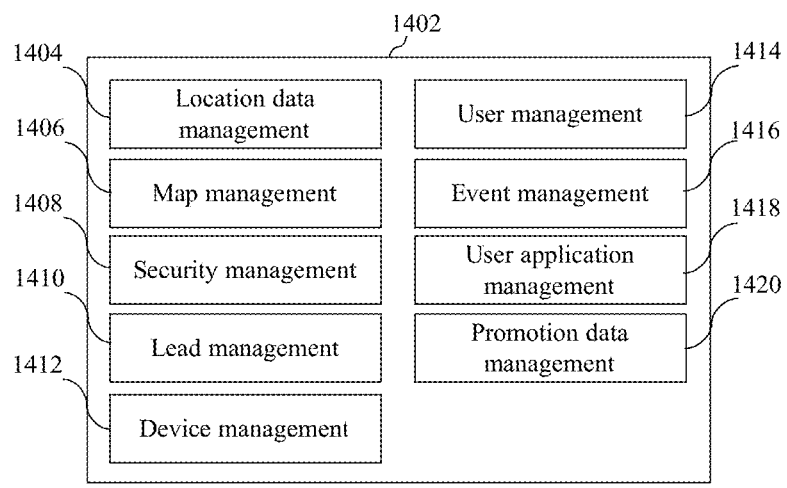
FIG. 14.1

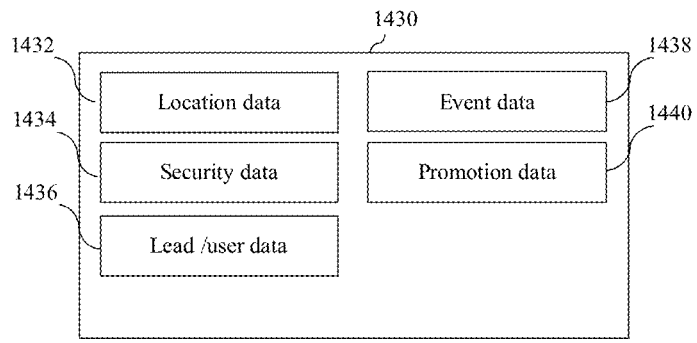
FIG. 14.2
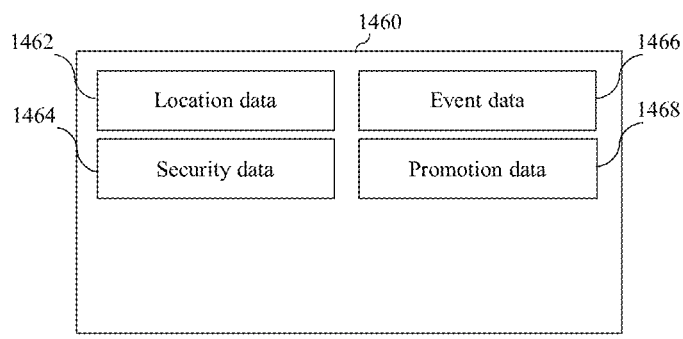
FIG. 14.3
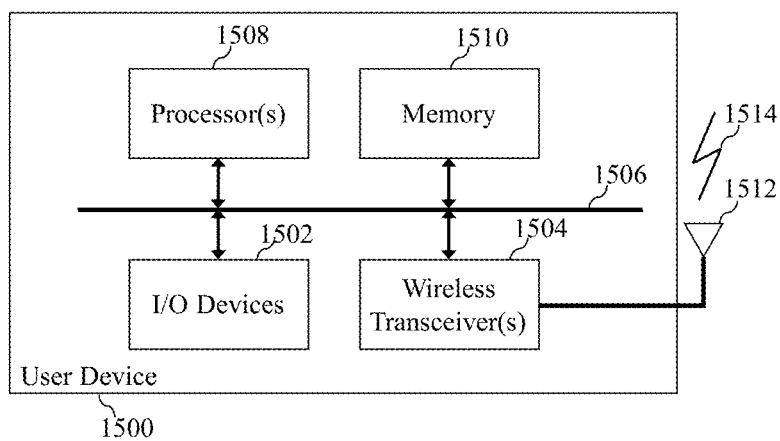
FIG. 15

SYSTEMS AND METHODS FOR REAL-TIME USER ENGAGEMENT AND INTERACTIONS

CROSS REFERENCE TO RELATED APPLICATIONS

This application claims priority benefit of U.S. Provisional Patent Application No. 62/561,809, filed on Sep. 22, 2017, which is incorporated by reference herein in its entirety.

BACKGROUND

Field of the Invention

The invention generally relates to systems and methods for real-time user engagement and interactions.

Description of the Related Art

Location-based technologies have been advanced in recent years. In the outdoor environment, he location information of a user can be provided by a global positioning system ("GPS") or a cellular system. However, GPS cannot provide accurate enough location information due to various factors such as obstructions, weather conditions, complex indoor conditions, etc. Cellular systems cannot provide accurate indoor location of a user as well due to factors through the wireless signal propagation and the deployment of cellular base stations. In the indoor environment, knowing the accurate location information of a user is a challenge. There are many technologies can be used to identify a user's location or coarse location, e.g., a user's proximity to an object. Geo-fencing is a general technology for allowing the identification of a user's proximity to a place which can be realized by GPS, near-field communication ("NFC"), or radio-frequency identification ("RFID"). RFID can provide such proximity information to an object but it is not accurate and not general available on today's user devices such as smartphones or tablets.

Bluetooth Special Interest Group ("SIG") has defined Bluetooth 4.x and 5 specifications, from which a proximity-based notification with low power consumption is available to the Bluetooth modules supporting the Bluetooth Low Energy ("BLE") technology. This beaconing technology is available to many modern smartphones, tablets, computers, and other devices.

The BLE technology provides fundamental information of a beacon device, such as proximity and identity. The teaching of inventions has extended its functionalities in various ways, including the security measures (U.S. Pat. No. 9,596,600, field on Apr. 24, 2015), BLE beacon-based protocol (U.S. Pat. No. 9,603,013, filed on Aug. 15, 2014), location-based machine-assisted interactions (U.S. patent application Ser. No. 14/274,763, filed on May 11, 2014), and beacon control techniques (U.S. Pat. No. 9,591,570, filed on Apr. 7, 2015).

The indoor location information can also be provided by Wi-Fi. Traditionally, the geolocation information is provided by a database provider who manages the coarse location information to fixed Wi-Fi devices. Recently, the Wi-Fi Alliance has developed the Fine Timing Measurement ("FTM") protocol in IEEE 802.11-2016 to enable the meter-level accuracy for location-based services ("LBS") without the need for a network infrastructure. This technology has a better accuracy than the one using the mostly-used signal-strength measurement.

These indoor localization technologies have enabled LBS applications. The location information on a mobile device is used to collect customer's feedback (U.S. patent application Ser. No. 13/335,528, filed on Dec. 22, 2011).

The method for mobile-based commerce (U.S. patent application Ser. No. 14/261,227, filed on Apr. 24, 2014) can use iBeacon for retrieving merchandise information; however, it does not address the professional events or conference, where the system reliability, security, and roles of users should be addressed.

Applying an LBS into an event is not enough, as there are several requirements that need to be met. First, in the case of an indoor venue or an outdoor venue for an event, in addition to knowing the location information, the quality of experience is important. When users use the BLE-based smartphones to retrieve location information, response signals should be made very fast within a time span usually at the scale of milliseconds. However, the response time using GPS or cellular network often exceeds that required time span. Second, a system should be able to have fault tolerance to network interruptions and interference with wireless signals from networking systems. For example, the system should work independently from the existing systems such as GPS and cellular networks as network interruptions may happen. Third, using the backbone network service may not be cost-effective as, for example, using the LBS provided by the network operator results in subscription fees.

U.S. Pat. No. 9,204,257, filed on May 22, 2014, describes an indoor infrastructure consisting of a series of Bluetooth beacons for mapping, navigation, and marketing of merchants where GPS mapping is not available. However, the invention is mainly used for binding the beacon ID with the location, and it does not consider dynamic creation of some non-fixed location gateways for facilitating the process for determining location information for configurable accuracy and for interacting with the RF beacons in the vicinity. In addition, the specific means for user interaction and social networking in an event is not described.

U.S. Pat. No. 8,397,984, filed on Sep. 15, 2011, is an on-site ticket management for an event, where a specific ticket validation system is described. However, it does not cover systems using beacons and/or location information regarding event management, user interactions, and social networking.

U.S. patent application Ser. No. 14/829,382, filed on Aug. 18, 2015, describes event management system for facilitating user interactions at a venue, where an electronic beacon is used to check the electronic ticket information on site of an event and to facilitate the transactions for merchandise purchases. However, the system does not address the interactions between attendees and exhibitors or business patrons.

U.S. patent application Ser. No. 14/221,223, filed on Mar. 20, 2014, describes the on-site check-in method using mobile devices in location of a multiple of check-in locations at an event venue. However, it does not use any LBS and it does not cover any means for event activities and user interactions after check-in of the event.

U.S. patent application Ser. No. 13/752,213, filed on Jan. 28, 2013, describes a system for identifying and reacting to proximity event for retail establishments. However, it does not for the user interactions, promotion data views, and social networking at an event.

U.S. patent application Ser. No. 14/085,854, filed on Nov. 21, 2013, describes a location determination system in indoor space using wireless tags and tag readers. However, it specifies one way of determining location of wireless tags.

Furthermore, the invention does not address the quality of experience requirements and the user interactions in an event.

U.S. Pat. No. 8,671,001, filed on Dec. 30, 2010, describes a real-time attendance reporting system which periodically generating an attendance report based on event attendee list. However, the system only shows reporting analysis results based on checked-in users' information with barcode identifier the information from mobile devices of checked-in attendees.

The present interactions between event users is limited to the use of lead system using barcode technology for collecting attendee's information at the event venue by event patrons or exhibitors. However, there is a need for enhancing such lead system with the use of LBS-based technologies for an event.

In summary, first, currently LBS technologies do not provide essential functionalities for managing events and enhancing the experience for different roles of event users, such as attendees, patrons/sponsors, exhibitors, and organizers. Second, the multiple available LBS information provided by different systems are not fully utilized for multi-level precision to be used for LBS applications in an event. Third, they do not optimize to enhance the interactions, engagement, and experience between these different event users. Fourth, there is no systems and methods are provided specifically for data management and promotion activities in an event. In addition, there is no real-time services provided to the event users, such as real-time indoor navigation, data transfer and viewing on demand, and other interactive methods.

SUMMARY

In one embodiment of the present invention, a real-time event interactive system is provided that visitors or event attendees with BLE-based beacon devices can interact with one or more gateway devices ("gateways") of event users using the gateways, such as exhibitors, patrons, sponsors, organizers, event service providers, property management users, and business users. These gateways can be configured to provide real-time information for navigation and interactive activities to event users through an application server or through the built-in application endpoints running various application services. An exemplary scenario is in an exhibition/exposition event, where attendees carrying user devices such as smartphones, tablets, and wearable devices with BLE beacon modules and some attendees carrying the badges with a small-sized beacon device, called beacon tag, there are gateways and beacon tags deployed in exhibition spaces and physical objects (e.g., goods, demonstration setups, promotional materials, products, etc.) for promotional or business purposes, respectively, where each gateway is associated with the information with regard to the gateway user and business, and it is able to be configured to advertise wireless messages and/or receive wireless messages from beacon devices in the form of beacon tags or user devices. The exhibition spaces are defined as hotspot areas in a map of a venue for an event which is defined by an event exhibitor/sponsor/patron, an event service provider or a property management user and is viewable on a user application on a user device for facilitating navigation/directions and notifications (e.g., showing real-time booth location to users, guiding users to the locations of exhibition spaces, reminding users of the location of the next schedule items of an event, etc.), real-time viewing, exchange and distribution of promotion information between attendees and users in other roles (e.g., sponsors, patrons, exhibitors, organizers, moderators, etc.), recording user activities (e.g., history of hotspot areas visited, timestamps of visits, interactive activities with the exhibitor, retrieved promotional materials of exhibitors, etc.), real-time checking event-related information, and real-time interactions with the gateways, servers, and other beacon devices/tags. The system used in the exemplary scenario described above can be applied to various events such as social or business events. For example, in a museum exhibition, visitors carrying beacon devices are considered attendees, and the gateways can be mounted close to a collection of artwork, each gateway is advertising wireless messages containing descriptions that can be received by the user application running on the beacon devices. For visitors using user device, the information can be shown in real-time and for visitors using a beacon tag without a display, the information regarding the pieces of artwork visited and related information can be synchronized to a server and viewable on-line with any computer. In another example, visitors with beacon devices or user devices in a commercial property such as a business center, a hotel, a recreation center, or shopping mall, can use the deployed gateways in the property to receive promotional, services, or navigation information on their beacon/user devices.

In one embodiment of the present invention, a real-time system is provided that event users with beacon devices or modules on their user devices, such as smartphones, tablets, laptops, or wearable devices, can access location information through gateways or servers. The location information can be proximity information indicating a beacon device's proximity to a gateway; or it can be more precise location information indicating the distance of a beacon to a gateway or the coordinates of a beacon device in a certain coordinate system. In various embodiments, the location information of a beacon device can be obtained with its communication with one or more gateways, where gateways may need to interact with other gateways or other external devices providing location information to collaboratively obtain a fine-grained location information. An exemplary external device providing location information may be a personal-area network ("PAN") device, such as Bluetooth, ZigBee, and Z-Wave, a local-area network ("LAN") device, such as an Ethernet router and Wi-Fi router, or a wide-area network ("WAN") device, such as a cellular base station based on, without limitation, Long-Term Evolution ("LTE"), Universal Mobile Telecommunications Service ("UMTS"), and narrow-band Internet of Things ("NB-IoT").

In various embodiments of the present invention, a beacon device for interacting with gateways and other beacon devices or tags is provided. A beacon device may be part of a user device or a standalone device as a small beacon tag, where either type of such beacon device runs a user application for being able to be configured with security and other configuration parameters, interacting with gateways, sending and receiving wireless messages encapsulating identifiers and/or metadata, processing wireless messages from gateways and other devices, outputting data to external input and/or output ("I/O") devices, taking user inputs, etc. In addition, the user application running on a user device with a display can have additional functionalities such as displaying directions/navigation, alerts/notifications, and providing various user interface features. In one implementation, a beacon tag attached to a physical object can transmit wireless messages to other beacon devices, or can respond to other beacon devices' messages for sending data, such as object information (e.g., model, name, manufacture, function, description, dimension, etc.) and business/promotion information.

In various embodiments of the present invention, a gateway for determining the location information of beacon devices and for interacting with beacon device users is provided that a gateway measures the signal strength of the wireless signals transmit by beacon devices in the vicinity; interact with servers for data transfers and device management; interacts with beacon devices in the vicinity; provides identification, authentication and authorization of beacon devices, protection of data integrity and confidentiality of communications between a beacon device and a server or a gateway; interacts with a server on behalf of a beacon device; interacts with other gateways and/or external devices for determining location information of a beacon device; provides collection, generation, and conversion of data from or identified by the beacon devices matching lead/user information; and optimizes quality of experience of event users.

In one embodiment of the present invention, a user interaction system is provided that users using user devices (e.g., smartphones, tablets, laptops, and wearable devices, etc.) with a built-in beacon device (e.g. a BLE-based module, etc.) can use a user application for enhancing the user interactions with the event users and user experience. An exemplary user application can provide functionalities for alerting users of the presence of a gateway in the vicinity; notifying users of the next schedule items of an event together with the directions based on a user device's current location information determined by a user device and/or by an interaction with a gateway; obtaining event information through a gateway/server; checking business/promotion information from an event exhibitor; processing business/promotion data identified by wireless messages received from gateways; showing contextual menus for allowing users to participate a social activity or any interactive activity which can be participated digitally using the user application, such as a door prize game; interacting with servers/gateways for obtaining configuration information and security information; processing and displaying viewable promotion information in various formats.

Optionally, a user application running on a user device can be used to automatically create the hotspot areas in a venue for an event by surveying and/or scanning gateways on-site through visiting gateways or through communications in a star or a mesh network setup (which, for example, can be realized by the use of Bluetooth-based mesh networking) where the location information may be provided by geolocation information associated with the existing devices or systems, such as, without limitation, on-site Wi-Fi networks, and cellular networks based on UMTS, LTE, NB-IoT, and 5G.

In one embodiment of the present invention, a system for interactively participating in an activity in real time for event users is provided that a user can use his/her user device to participate in the interactive activity. For example, users who are close to a space of an exhibitor can participate in a real-time interactive game as an interactive activity set by an exhibitor or an event service provider.

Optionally, instead of using a user device with a display, a standalone beacon device in the form of a battery-powered or energy-harvester-powered beacon tag attached to a badge of a user can be used to participate in the interactive game by using input devices.

In various embodiments of the present invention, an input device can be a button, a switch, or a motion-based sensor.

In one embodiment of the present invention, a system for transferring data securely between a server and a user device is provided that a user makes a request for viewing data which, for example, can be promotion information. In some embodiments, server's application services can be integrated into a gateway which provides server application endpoints and functions as a server for interfacing with user applications having functionalities including, for example, user authentication, access control, data encryption, etc. When a gateway functions as a server, most data transfers may be done on a local network which can improve the user experience through, for example, minimizing the delay of end-to-end data transmissions between a user application endpoint and a server application endpoint.

In one embodiment of the present invention, a system for interactively showcasing promotion data including, for example, products and services, in real time for event users is provided that a user device equipped with a beacon device can be used to respond with the promotion information (e.g., products and services information) of a patron, a sponsor, or an exhibitor in an event, and can check the data rendering in various forms, such as data rendering for generating two-dimensional ("2D") or three-dimensional ("3D") views, virtual reality ("VR") views, or augmented reality ("AR") views in a VR headset or in a display.

In one embodiment of the present invention, a system for beacon-gateway interactions is provide that either a gateway-initiated mode or a beacon-initiated interaction mode. In a gateway-initiated interaction mode, a gateway can be configured to advertise wireless messages to be received by beacon devices. In this case, a beacon device does not have to consume power by advertising wireless messages all the time but to respond to gateways after receiving gateways' wireless messages passively. In a beacon-initiated interaction mode, a beacon device can be configured to actively advertise wireless messages which can be received by gateways. Once a gateway receives the wireless messages from a beacon device, the gateway can parse the location and identifier data of the beacon device and process the data in various ways. One exemplary way of processing data is responding to a beacon device by sending business information associated with the gateway and/or sending additional metadata, e.g., the promotion data.

In one embodiment of the present invention, a method for securely bootstrapping, initializing, and configuring beacon devices and gateways is provided that beacon devices and gateways can be managed remotely for various purposes. For example, a beacon device operated by an event organizer may configure the beacon in terms of associating attendee's information with the beacon, adding security information (e.g., security credentials, access control policies, etc.), and storing other metadata for an event. A gateway used by an exhibitor may be configured to add the sponsor/patron/exhibitor's information, security credentials and/or policies, promotion data, etc.

In one embodiment of the present invention, a method for creating a map of a venue for an event is provided that a map is created with additional information of gateway location and business information associated to hotspot areas for an event for various purposes. For example, the hotspot areas in a venue for an event may be generated to indicate exhibition booth spaces, product demonstration spaces, event activity spaces, and spaces of artwork. A hotspot area is defined through an event user who has a role of an organizer or an admin. Each hotspot area is associated with one or more gateways. Optionally, hotspot areas can be automatically created by an on-site surveying and/or scanning of gateways. This scanning and surveying process of gateways can be done on a dedicated user device (running an application which can receive gateway messages) through manually visiting the gateway sites and/or through the automatic message transmissions from gateways across a local communication network in a deployment following a star, a line, a mesh, or an ad hoc fashion.

In one embodiment of the present invention, a system for real-time event management system is provided that event users in different roles, such as attendees, patrons, sponsors, exhibitors, organizers, event service providers, or property management users, can be managed; the map information for one or more events can be managed, the location information for beacon devices/tags, gateways, and/or external devices can be managed; the lead information can be managed; the security information, such as the security credentials and policies of servers, beacon devices/tags, user devices, and gateways, can be managed; the devices can be managed; the event information, such as the schedules, activities, venues, directions, websites, multimedia, news, and promotion data, can be managed; the user applications on beacon devices/tags, user devices, gateways, and servers can be managed; and promotion data in various forms can be managed.

DETAILED DESCRIPTION

The above and other features of this invention are described in the following detailed description shown in the drawings. The ensuing description provides exemplary embodiments only, and is not intended to limit the scope, applicability, or configuration of the disclosure.

FIG. 1 shows a system 100 which includes various beacon devices 104, 106, 108, 110, and 112 and collectively as the beacon device 104, a gateway 102, a server 116, a communication network 118, a wireless communication link 114, a user device 120, a user application 122 on the user device 120, and a beacon tag 138. The number of the users, gateway 102, beacon device 104, beacon tag 138, communication network 118, server 116, and user device 120 is for exemplary purposes and can be extended to any number. In some disclosed embodiments, the beacon device 104, either in the form of a standalone beacon tag 138 or of a beacon device module included in a user device 120 such as a smartphone, transmits wireless messages to notify its proximity to gateways 102. In some embodiments, a beacon device 104, a beacon tag 138, or a user device 120 has connectivity options to the communication network 118 by beacon device itself or by an additional network interface hardware. Exemplary network interface hardware includes personal-, local-, or wide-area networking technologies, such as the NFC, RFID, IEEE 802.15.4, BLE, IEEE 802.11, Long-Term Evolution ("LTE"), or NB-IoT technologies. In some embodiments, a user device may be a smartphone including the beacon device where the software or firmware on smartphone can directly manipulate the beacon device. In some embodiments, an operating system present on the beacon device 104 and/or on the user device 120 may interface with the proximity and event-related notifications. Exemplary operating systems include full-fledged operating systems, such as Windows, Linux, and Apple macOS. Exemplary operating systems include embedded operating systems, such as mbed OS, OpenWrt, FreeRTOS, μC/OS-II/III, RIOT, and Contiki OS. Exemplary operating systems include mobile operating systems such as Android OS, iOS, and Windows 10 Mobile.

In one embodiment, when a user with the beacon device 104 included in the user device 120 is in the vicinity of a gateway 102 measured by the signal strength by a transceiver component, the beacon device 104 will communicate with the gateway 102 and the server 116 through the communication network 118. The communication between the beacon device 104 and the gateway 102 can be initiated either by the beacon device 104 or the gateway 102. With the response messages sent back from the server 116 or the gateway 102, the user application 122 will show the notification message 124 and the contextual menus such as the "View products & services" menu 126 and "View documents" menu 128, "Interactive Activities" menu 130, and the "Navigation" view 132 showing the real-time navigation in an interactive indoor map. The beacon device 104 can be an embedded system running an operating system. Exemplary user devices 120 include smartphones, laptops, tablets, handheld computers, a wearable computing device, etc.

Optionally, a beacon device 104 can be a standalone beacon tag 138 consisting of input devices such as buttons 140, 142, 144, and 146, and a barcode 148. When a user using the beacon tag 136 moves to the vicinity of the gateway 102, the beacon device 104 will communicate with the gateway 102 and to the server 116 through the communication network 118. The buttons 140, 142, 144, and 146 can be configured by a user application 122 or software for application-specific purposes. For example, the button 140 can be used to allow users to input an option "A" in an interactive application, providing the "Satisfactory" rating for a customer feedback app, or initiating the manual transmission of wireless messages for communication with the gateway 102, or allowing a remote service hosted on the gateway 102 or the server 116 to update its software or configuration parameters for device management purposes. In addition, the barcode 148 on one side of the beacon tag 138 can be used to provide the physical unique identifier of the beacon tag 138 able to be read by a barcode reader in addition to the identifier information encapsulated in its wireless messages. In some embodiments, the button in 140, 142, 144, or 146 can be configured for other purposes, such as power on/off, reset, manual triggering of configuration or setup, device debugging, device software/metadata updates, and diagnosis. The number of the buttons 140, 142, 144, and 146 may be more or less. In some embodiments, the beacon tag has the capability of storing some information received from the gateways for an event. Exemplary information includes gateway device identifiers, gateway locations, the business information associated with the gateway, gateways visited, other beacon devices' identifiers from beacon devices used by event users or used for promotional/demonstration purposes on physical objects.

Optionally, the gateway 102 can interact with the beacon devices 104, 106, 108, 110, and 112 in a local network environment without a connection to the server 116, where the gateway 102 may connect to a host computer or a central computer of the local network, and function as the server 116 of the local network. In some conditions, combining the functions of the gateway 102 and the server 116 into one gateway 102 deployed within a local network or at the network edge may be an advantageous setup when performance degradation, disruptions, or losses of an internet connection occur.

In one embodiment, a user attending an exhibition event in an indoor venue and using a user device 120 (e.g., a smartphone, a tablet, a wearable device, etc.) equipped with a BLE beacon module 104 which is turned on and configured to advertise wireless messages by a user application 122. When the smartphone is close to the gateway 102 which is within the booth space of a patron, the notification message 124 will show on the user device 120 and some exemplary contextual menus 126, 128, 130 and navigation view 132 showing an overlay of an indoor or outdoor digital map and an overlay of hotspot areas 134 and 136 will be available to allow a user to view the products and services 126 and other contents hosted on the server 116 across the communication network 118. The user can see his/her indoor location in the navigation view 132 in real-time according to the pre-known location of the gateway 102 and navigate to other places in a venue for an event.

In one embodiment, a user is a visitor to an arts museum with the user device 120 with a BLE beacon module 106 which is turned on and configured to advertise wireless messages by a user application 122. The artworks such as paintings, sculptures, and other general art objects in the museum have the devices functioning as the gateway 102 mounted next to them which are able to sense the user's proximity and to advertise wireless messages encapsulated with its descriptive information. When the user walks close to an art object, where the gateway 102 is mounted on or next to it, the messages transmit by the gateway 102 can allow the user application 122 to contact the server 116 across the communication network 118 to retrieve the information about the art object displayed in the text area of the message 124 or in the menu 128. In the navigation view 132, the user will see his/her real-time location in the museum. Optionally, without contacting the server 116, the user application 122 may be able to show the brief information of a painting from the wireless messages directly received from the gateway 102.

In one embodiment, users participated in an outdoor event within a geographical area, where there are different booths set up by exhibitors for exhibition, demonstration, or promotion purposes in the venue, can access the business/promotion information when they are in vicinity of the booth spaces where the gateways 102 are installed. For example, a user with the user device 120 with the built-in beacon device 104 can use the user application 122 to interact with an exhibitor's beacon tag 138 and gateway 102. A user can also use his/her beacon tag 138 to interact with the gateway 102.

In some embodiments, in a confined outdoor area or in an indoor area with various spaces such as stores, meeting rooms, demonstration areas, information booths, and parking areas, users can utilize the user application 122 with the beacon device 104 to get location-based information. The spaces can usually be digitally represented as hotspots shown on a computer screen or a display in general. In one embodiment, the user application 122 requires to retrieve digital contents from a local gateway 102 or a remote server 116. Exemplary information includes the promotional information of stores, meeting schedule of a meeting room, guide contents of an information booth, product contents of a demonstration area, parking availability of a parking area, etc.

FIG. 1.2 illustrates an example navigation view of a user application including a map 132, current beacon device location 150, multiple hotspot areas as 134, and history of visited hotspot areas 134 and 136. In some embodiments, the map 132 is associated with additional information and is created through a server application service, which is retrievable by a user application 122. The hotspot areas may be processed for viewing on a user device and the history of visited hotspot areas 134 and 136 are stored on the user device, which may later be synchronized to a gateway 102 and/or a server 116. The location information of the beacon device can be used to store the contextual and analysis information, including, without limitation, for example, upcoming schedule item(s), business information and gateway information associated with the hotspot areas, number of event users visited in a timeline, and various rendered formats of navigation waypoints, etc.

FIG. 2 shows a system 200 consisting of two users, one using the user device 202, and the other using the badge 204 with the beacon tag 206, and the users interact with the gateway 208 which is placed on an object surface 216 or installed onto a divider 218 while the beacon tag 210 is installed on a physical object 212. The number of users, user devices 202, beacon tags 206 and 210, gateways 208, object surface 216, dividers 218, and physical objects 212 is for exemplary purposes and can be extended to any number. In some embodiments, the divider 218 can be a partition panel, a wall surface, or any partition object. In some embodiments, the physical object 212 may be a physical product, a demonstrator, a demonstration setup, a display, or a promotional material. The beacon tag 210 and the beacon tag 206 may have the same hardware components running with different software and/or firmware. The beacon tag 206 may have partial functionalities of the user device 202 as the beacon tag 206 may need to run in a low-power mode and may not have a display as the user device 202. The beacon tag 206 can be configured to automatically or manually interact with the gateway. For example, a user can pre-configure his/her online settings through a web or user application to automatically save the visited hotspots identified by the gateway(s) 208, and to automatically receive the promotional materials from the exhibitors identified by the gateway(s) 208. In order to do that, the beacon tag 206 can periodically send wireless messages through wireless signals 214 to the gateway 208 so that the gateway 208 can identify the beacon tag 206 upon the reception of its wireless message(s) containing its identifier. In some embodiments, the identifier information contained in the wireless message(s) of the beacon tag 206 may be encrypted which can be decrypted on the gateway 208 with the preconfigured security credential information on the gateway 208 and the beacon tag 206 through a bootstrapping, initialization, or configuration process. A user using the beacon tag 206 can also manually interact with the gateway 208 with the pre-set procedures or functional input devices. For example, a user using the beacon tag 206 can press a button to request for promotional materials of an exhibitor with the help from the gateway 208 of the exhibitor.

FIG. 3 shows a system 300 including a user using the user device 302, a user using the beacon tag 304, a gateway 306, wireless signals collectively represented as the wireless signal 314, a display 310, an example interactive application 312 shown on the display 310, and a connection 308 connecting the gateway 306 and the display 310. The connection 308 may be a cable or a wire used for a serial communication interface, such as Universal Serial Bus ("USB"), RS-232, RS-485, High-Definition Multimedia Interface ("HDMI"), and DisplayPort. As an example, the interactive application 312 can be an interactive game viewable on the display 310 that can be participated by and can take inputs from users either using the user device 302, such as a smartphone, or using the beacon tag 304. In one embodiment, the gateway 306 can output the interface of the interactive application 312 to a television, a monitor, or a computer with the display 310 through the connection 308. In some embodiments, the gateway can output the interface of the interactive application 312 wirelessly without using the connection 308. In some embodiments, a computer with the display 310 can output the interface of the interactive application 312 to the display 310 based on the data sent from the gateway 308 connected to it via the connection 308.

FIG. 4 shows a system where multiple beacon devices 406, 408, 410, 412, 414, 416, 426, 428, 430, 432, 434, and 436 and collectively as the beacon device 406, connected to multiple gateways 404 and 424 within the wireless communication range 402 of the beacon device 406, and the additional gateways 440, 442, 444, 446, 448, and 450 are present. In some embodiments, the gateways 440, 442, 444, 446, 448, and 450 can be gateways in geographically distributed locations or they can be co-located in a venue of the gateways 404 and 424. In some embodiments, the gateways 440, 442, 444, 446, 448, and 450 can be external devices providing location information. Exemplary external devices, without limitation, include ZigBee gateways, Bluetooth gateways, Wi-Fi routers, cellular base stations, NB-IoT gateways, LoRa/LoRaWAN gateways, SigFox gateways, and other devices providing geographical location information or reference information for calculating locations for the beacon device 406. In some embodiments, the beacon device 406 advertises the wireless signals above a certain threshold of electric power that can be received by the gateway 404, the beacon device 406 is considered in proximity to the gateway 404 or 424.

In some embodiments, the gateways 440, 442, 444, 446, 448, and 450 together with the gateways 404 and 424 can be collaboratively communicate with each other to calculate the locations of one or more beacon devices like 406, in order to facilitate the determination process for a beacon's proximity to a gateway or for location information of a beacon. The collaborative communication between the gateways 404, 424, 440, 442, 444, 446, 448, and 450 can be through a network formed a priori or in a star, an ad hoc, or a mesh fashion.

In one embodiment, the gateways 440, 442, 444, 446, 448, and 450 may use a built-in database structure or an external database on a server and they may collaboratively communicate or exchange location information with each other in order to establish a distributed or a central location database for the beacon device(s) 406 and user devices.

FIG. 5 shows a flow diagram illustrating a high-level process for onboarding users into an interactive application. At 502, a gateway first determines the proximity of the beacon devices on user devices. In some embodiments, a user's proximity to a gateway is determined by the strength of the wireless signal sent from a beacon on the user device received by the gateway. In some embodiments, a user application running on a user device determines its proximity or location to a gateway and synchronize such location information to a server, which can be retrieved by a gateway to determine a user's proximity to itself. In some embodiments, the proximity of the beacon is determined by a collection of gateways or external devices providing location information with which a higher precision of such proximity or location information can be made.

At 504, a user application on the user devices establishes a connection to the server. In some embodiments, the user application establishes a temporary or long-term logical connection to the application endpoint on the server in order to send the messages along that connection. This connection can be made by an end-to-end transport- or application-layer protocol based on the TCP/IP protocol stack. In some disclosed embodiments, the risk assessment may suggest to use security mechanisms such as Transport-Layer Security ("TLS") or Secure Sockets Layer ("SSL") and data encryption over the connection.

At 506, the server authenticates the user and receives the user-related information sent by the user application if the user is successfully authenticated. In some embodiments, the mutual authentication between the user application and the service endpoint may be required. In some embodiments, the authentication is sent over the secured connection made at 504.

At 508, the server will prepare the users for participating in an interactive application. In some embodiments, the interactive application may be a social game allows multiple users to enter in order to win a prize or to show a tutorial of a product. In some embodiments, the connection at 504 established between a user application and a server can be a temporary or dedicated logical connection. In some embodiments, a unique code of an interactive application session is generated by the server to allow users to participate in the interactive application. This is advantageous for the users who experience difficulties in participating the interactive application with the beacon devices and/or who want to participate in the interactive application directly.

In one embodiment, the users are close to a gateway which are determined by a user application at 502. Then the user application establishes a logical connection to the server through the internet at 504. Before the user application send user data such as user profile, its proximity to a gateway to the server, it needs to send messages for authentication purposes on the application endpoint on the server as shown at 506. The application endpoint will generate a unique code and send it to the user application for the user to enter into an interactive application with other users, at 508. If the user enters the interactive application, the application interface will show up to the user at 510.

FIG. 6 provides an overview of an exemplary process for data transfers between a user and a server.

At 602, a gateway first determines the proximity of the beacon devices on user devices. In some embodiments, this can be done through a user application on a beacon device sensing the gateway's wireless messages, or through a gateway sensing the beacon device's wireless messages.

At 604, the user's status info is sent to the server. In some embodiments, the user's information includes the user's identifier, security credentials, server's credentials, and metadata.

At 606, the user's info is used to authenticate the user. An access control policy may be applied after the authentication. In some embodiments, mutual authentication may be required between the server and user application endpoints where the pre-configured or dynamically generated server's credential on the user application endpoints can be used.

At 608, the data objects are sent from the server to the user device.

At 610, these data objects are used for being rendered, displayed, and stored by the user application on the user device.

FIG. 7 illustrates a process for generating and maintaining the location database for an event for providing fine-grained location or proximity information for beacon devices. At 702, a gateway first determines the proximity of the beacon devices on user devices. In some embodiments, this can be done through a user application on a beacon device sensing the gateway's wireless messages, or through a gateway sensing the beacon device's wireless messages.

At 704, the user information including the location or proximity information is sent to the location database. In one embodiment, the location or proximity information is represented by the one-to-one relationship between the beacon and the closest gateway stored in a database which can be hosted on a server or a gateway acting as a server. In one embodiment, the location or proximity information is represented by one or more entries, each having a few fields showing the one-to-one relationship between a beacon device and a gateway, such as the unique identification of a beacon device, the unique identification of a gateway, and the relative distance from a beacon device to a gateway, and the coordinates of a beacon device and a gateway.

At 706, the discovery process of other devices providing location information is made. This discovery process aims to get additional information or proximity from the devices. In some embodiments, the devices are adjacent gateways which know or can determine the proximity or location of a beacon device.

At 708, the judgment of whether an entry in the database exists or not is made. At 710, if there is no entry in the database, an entry will be created. At 712, if there is an existing entry, the entry will be updated. In some embodiments, the update of an existing entry means replacing the existing entry with a new entry, or adding a new entry in the database.

At 714, the change in the database is propagated to the related gateways. In some disclosed embodiments, at 714, when propagating the location information to gateways, a database on a gateway or a host can piggyback the user-defined data message alongside the location information.

FIG. 8 shows a process for transferring, and rendering the data of objects in various formats for user's viewing.

At 802, a beacon on a user device determines it proximity to a physical object attached with another beacon which can be sensed by the beacon on user device. In some embodiments, the BLE beacon device module on a user's smartphone can sense its proximity to another BLE beacon attached to a physical product or a promotional material of a product.

At 804, a logical connection is established between the user device and a server for the preparation for the data transfers. In some embodiments, the protocol endpoints at the user device and the server is used to establish a logical connection for communication. In some disclosed embodiments, the user device will send the sensed beacon to the server after the connection is established.

At 806, the server sends the data of one or more objects to the user device. In some embodiments, the data of the physical object identified by the beacon attached as well as other data of related objects may be sent to the user device. For example, the server may send the data of a physical oscilloscope and the data of related, tools, wires and workbench showing how to use the oscilloscope in action.

At 808, the user device will render the received data of objects. In one embodiment, the data may be rendered in 3D format viewable on the screen of a user device. In one embodiment, the data may be rendered in 3D format viewable with a VR headset as an I/O device connected to the user device.

At 810, a user can manipulate the object rendering on the user device by his/her inputs taken by the user device. In some embodiments, the inputs given by a user can be generated by user's motion or sensors on or connected to the user device such as gyroscope and accelerometer.

FIG. 9 shows a process for gateway-initiated interactions between a beacon device (or a user device) and a gateway.

At 902, the gateway checks its configuration parameters to determine whether it is in an active advertisement mode or not. In one embodiment, the configuration parameters are stored in the permanent storage of the gateway. In some embodiments, the configuration parameters can be stored in a hardware setting such as pins, switches, or pushdown buttons.

If the gateway is configured in the advertisement mode, it will send or broadcast wireless advertisement messages so that the beacon devices in the vicinity of the gateway can receive the messages, at 904. In some embodiments, the wireless advertisement messages may be omnidirectionally or directionally to beacon devices. In some embodiments, the advertisement messages encapsulate some information, e.g., device identifier, business identifier, exhibitor's profile, merchandise/promotion/demonstration information, etc. At 906, the gateway will then check if there is a response message sent back from a beacon. If not, the gateway will wait and process messages received other beacon devices, if any, while sending the advertisement messages at 904. At 908, the gateway will save the information parsed from the response message. In one embodiment, the information may be the beacon's identifier, request data, and user information of the beacon. In some embodiment, the information can just be the beacon's identifier which can be used to retrieve the related information such as beacon user profile, preference, subscription, etc.

If the gateway is not configured in the advertisement mode, the gateway will check if there is a wireless advertisement message sent from a beacon device, at 910. If so, the gateway will send a response message back to the beacon device, at 912, and save the information parsed from the advertisement message(s) received from the beacon, at 914. It is possible to receive multiple messages including the same or different information from the gateway.

At 916, once the gateway has the information retrieved from the beacon devices, it will process the information locally and then at 918 synchronize the processed information to a server securely.

FIG. 10 shows a process for beacon device-initiated interactions between a beacon device (or a user device) and a gateway.

At 1002, the beacon checks its configuration parameters to determine whether it is in the advertisement mode or not. In one embodiment, the configuration parameters are stored in the permanent storage of the beacon. In some embodiments, the configuration parameters can be stored in a hardware setting such as pins, switches, or pushdown buttons.

If the beacon is configured in the advertisement mode, it will send or broadcast wireless advertisement messages so that the gateways in the vicinity can receive the messages, at 1004. In some embodiments, the wireless advertisement messages may be omnidirectionally or directionally to gateways. In some embodiments, the advertisement messages encapsulate some information, e.g., device identifier, user/business identifier/profile, preference settings, etc. In some embodiments, the beacon device saves the preference setting and profile of a user or a business unit, which can be used to send to the gateway to identify which information (e.g., product & service information, newsletters, promotional materials, etc.) should be received and saved from the exhibitors who users the gateway. At 1006, the beacon then will check if there is a response message sent back from a gateway. If not, the beacon will wait while sending the advertisement messages at 1004. At 1008, the beacon will save some information parsed from the response message. In one embodiment, the information may be the gateway's identifier, business identifier, and location values. In some embodiments, the information can simply be the gateway's device identifier which can be used to retrieve the related information such as exhibitor's profile, promotion materials, etc.

If the beacon is not configured in the advertisement mode, the gateway will check if there is a wireless advertisement message sent from a gateway, at 1010. If so, the beacon will send a response message back to the gateway, at 1012, and save the information parsed from the advertisement message received from the gateway, at 1014.

At 1016, once the beacon has the information retrieved from the gateway, it will process the information locally for use in a user application and then at 1018 synchronize the processed gateway-related information to a server securely.

FIG. 11.1 illustrates a process for updating/storing beacon's configurations on a server for configuration purposes ("configuration server") with a configuration application running on a host computer. The host computer can be an individual computer, or an integrated part of the server or a gateway. At 1102, the application for the configuration process initiates the configuration process by downloading configuration information from a configuration server. In some embodiments, the configuration server may be a server application resided in a physical server deployed locally or remotely by means of a communication network, providing endpoint able to communication with the other endpoint of the configuration application for such configuration process. At 1104, the identifier(s) of one or more beacon devices will be scanned into the configuration application. In some embodiments, the scanning can be done by a beacon device, which is able to read the beacon identifiers (such as barcodes or identifiers parsed from wireless messages) and is connected to the host running the configuration application. At 1106, once the existing configuration information stored in the configuration server is downloaded, the new or updated configuration information can be made from the inputs of a user who operates such configuration process. In some embodiments, an interface on the configuration application is shown for a user to input or modify the configuration information associated with one or multiple beacon devices. In addition, the batch operation of configuring common parameters into beacon devices may be done through one common interface where some parameters (e.g., name, location, etc.) can be input by a user and other parameters (e.g., beacon identifiers, beacon serial numbers, security credentials, etc.) can be generated automatically with the configuration application. Optionally, some common parameters of beacon devices can be made with the manually defined pattern. For example, some beacon identifiers or names can all begin with a common string such as "XYZ" which is application specific. At 1108, the new configuration information will be securely sent to the configuration server. In one embodiment, a secure end-to-end connection may be established with data protection methods enabled. For example, the configuration parameters may be encrypted through a symmetric or asymmetric cryptographic method with the pre-stored keys on beacon devices, a host running the configuration application, and configuration server, such as Advanced Encryption Security ("AES") or RSA, over a SSL or TLS connection, although there may be additional security mechanisms used. At 1110, once the configuration server receives the new configuration information, it will store the configuration information.

FIG. 11.2 illustrates a process for configuring a beacon from a server with a configuration application. At 1132, one or more beacon devices need to be prepared for a configuration process. This may be done (1) through a special command sent to beacon devices through a wireless or wired connection between the beacon and a host computer assisting in the configuration process, or between the beacon and a configuration application internally having access to the beacon, or (2) though a hardware configuration setting with, for example, switches, buttons, or pins. At 1134, the identifier(s) of one or more beacon devices will be scanned into the configuration application. In some embodiments, the scanning can be done by a beacon device, which is able to read the beacon identifiers (such as barcodes or identifiers parsed from wireless messages) and is connected to the host running the configuration application. At 1136, the configuration information will be securely sent to the configuration server. In one embodiment, a secure end-to-end connection may be established with data protection methods enabled. For example, the configuration parameters may be encrypted through a symmetric or asymmetric cryptographic method with the pre-stored keys on beacon devices, a host running the configuration application, and configuration server, such as AES or RSA, over an SSL/TLS connection, although there may be additional security mechanisms used. At 1138, the existing configuration information will be retrieved from the configuration server through the secure connection established at 1136. At 1140, once the configuration application receives the configuration information, it will send the configuration parameters to the beacon. In one embodiment, the configuration information for a beacon may be pre-configured on a configuration server. In some embodiments, the default configuration information containing common configuration parameters regarding an event may be used to configure a beacon device, such as event name, patterns of beacon devices' names and identifiers, etc., while other beacon-specific configuration parameters can be automatically generated.

FIG. 12 illustrates a process for initializing or configuring a gateway from a configuration server. At 1202, a gateway sends a request for initialization or configuration to the configuration server. An initialization process on a gateway usually require some (up-to-date) data to be transferred from the configuration server. In one embodiment, the data may include gateway device information, business information associated with the gateway, security information, promotion information, location information, user information for an interactive application, application data, etc. In some embodiments, this initialization process may be used for transferring dynamic application data on demand. At 1204, a secure connection will be established between the gateway and the configuration server for data transfers in such initialization process. In one embodiment, a secure end-to-end connection may be established with data protection methods enabled. For example, the configuration parameters may be encrypted through a symmetric or asymmetric cryptographic method with the pre-stored keys on the gateway and the configuration server, such as AES or RSA, over an SSL connection, although there may be additional security mechanisms used. At 1206, the configuration server will process and send the data for initialization to the gateway. At 1208, the gateway will store the data for initialization and initialize the gateway with the data received at 1206. A rebooting may be required for the initialization process on the gateway.

FIG. 13 illustrates a process for creating a map of a venue for an event with hotspot areas and additional metadata. At 1302, a map of a venue for an event. The map is in a digital form which may be a floor plan or a map showing space setup in a venue for an event. In one embodiment, the map may be an image file marked with booth areas and other areas having activities of an event. At 1304, a coordinate system is chosen for use in the map uploaded to the server at 1302. At 1306, one or more overlays of hotspots will be planned and stored based on the map. At 1308, each hotspot area will be configured to associate one or more gateway device identifiers. At 1310, the relationship between a hotspot, gateways associated, and positions of the gateways in the map based on the coordinate system chosen at 1304 will be stored into a database. In one embodiment, the relationship information can allow the gateway device identifiers to be used as unique indices to retrieve the location and business information the gateways are associated to. For example, a user can access each hotspot area and its related information associated with the hotspot area such as the gateway identifiers and patron's profiles.

FIG. 14.1 shows a high-level block diagram of application services at a server application endpoint 1402, consisting of the location data management 1404, the map management 1406, the security management 1408, the lead management 1410, the device management 1412, the user management 1414, the event management 1416, the user application management 1418, and the promotion data management 1420. In some embodiments, the server application endpoint 1402 contains the software services 1404, 1406, 1408, 1412, 1416, 1418, and 1420.

In some embodiments, the location data management 1404 manages, for example, the location or proximity information associated with the beacon devices, gateways, and/or external devices providing location information with reference to FIG. 4. The map management 1406 manages, for example, the map information and additional information with regard to the map such as hotspot areas and associated information, such as business information, patron information, list of activities, list of promotional contents, etc. The security management 1408 manages, for example, the security credentials and policies of the beacon devices or beacon tags, user devices, gateways, servers, and the security configuration settings. The lead management 1410 service manages, for example, the lead profiles collected from an event, lead contact methods, legal consents from users, conversion methods for exporting lead information to other software such as Customer Relationship Management ("CRM") software or Enterprise Resource Planning ("ERP") software. The device management 1412 service manages, for example, the configuration, initialization, bootstrapping, software/firmware updates, maintenance, and event logging of gateways and beacon devices with reference to FIG. 11.1 and FIG. 11.2. The user management 1414 service manages, for example, user-related information including user registration information for events, user profile information, user credentials, contact information, images, etc. The event data managed by the event data management 1416 service manages, for example, the event-related information such as event name, location, direction, description, activities, schedule, etc. The user application management 1418 service manages, for example, application software and data on the user device, beacon devices, beacon tags, and servers. The promotion data management 1420 manages, for example, data contents used for promotional purposes in an event, including artworks, merchandize, documents, brochures/pamphlet/datasheets/posters, demonstration setups, digital scenarios, multimedia contents, any products and services in various forms. In various embodiments, a beacon device and a user device can access the promotion data managed by the promotion data management 1420 service hosted on a server or on a gateway.

FIG. 14.2 shows a high-level block diagram of the application data at a gateway application endpoint 1430, consisting of location data 1432, security data 1434, lead and user data 1436, event data 1438, and promotion data 1440. The location data 1432 may contain the gateway's own location and, if any, other gateway's location information, as well as possible beacon's information. The location data 1432 may be automatically obtained from the gateway's hardware, collaboratively from another gateway(s), or retrieved from a server. The security data 1434 may contain information such as security credentials and access control policies. The lead and user data 1436 may contain information such as lead and user data. The event data 1438 may contain event-related information such as event name, location, direction, description, activities, schedule, etc. The promotion data 1440 may contain information such as business information, patron/exhibitor's profile, demonstration, product and service information. In one embodiment, the data in the blocks 1432, 1434, 1436, 1438, and 1440 may be retrieved from a server running the application endpoint 1402. In one embodiment, the data in the blocks 1432, 1434, 1436, 1438, and 1440 may be obtained through the process with reference to FIG. 12 and may be stored in the internal database structure or an external storage medium connected to the gateway.

FIG. 14.3 shows a high-level block diagram of beacon application data at a beacon application endpoint 1460, consisting of the location data 1462, security data 1464, event data 1466, and promotion data 1468. The location data 1462 may contain the location data determined by the beacon itself or by a retrieval process from a server or a gateway. The security data 1464 may contain information such as security credentials and user information such as user's profile and preference. The event data 1466 may contain event-related information such as event name, location, direction, description, activities, schedule, etc. The promotion data 1468 may contain information such as registration/authorization information of an event, history of visited gateways, hotspots, beacon devices, and/or participated activities. In one embodiments, the data is stored in the permanent storage of a beacon device, such as flash memory.

FIG. 15 provides a block diagram of the user device 1500. The user device 1500 includes hardware elements that can be electrically coupled via a bus 1506. The user device 600 may further include (and/or be in communication with) one or more non-transitory machine-readable storage mediums or storage devices (e.g., memory 1510), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be flash-updateable, programmable, and/or the like. Such storage devices may be configured to implement any appropriate data storage, including without limitation, various file systems, database structures, and/or the like.

In one embodiment, the bus 1506 can be used for the processor(s) 1508 to communicate between cores and/or with the memory 1510. The hardware elements may include one or more processors 1508 including, without limitation, one or more general-purpose processors or special-purpose processors; one or more input and/or output ("I/O") devices 1502; and one or more wireless transceivers 1504 able to emit and/or receive wireless signals 1514. Optionally, I/O device 1502 can include various input devices including, without limitation, a camera, a touch sensitive screen, a motion sensor, a mouse, a joystick, a keyboard, a keypad, a touch pad, an accelerometer sensor, a gyroscope sensor, and/or the like. The user device 1500 includes one or more wireless transceivers 1504 connected to the bus 1506. The wireless transceiver 1504 may be operable to transmit and/or receive wireless signals 1514 via antenna 1512. A wireless signal 1514 transmitted by user device 1500 may be a signal compliant with a wireless communication standard. For example, embodiments are contemplated where the wireless communication standard is one or more of Wi-Fi, Bluetooth, BLE, NB-IoT, SigFox, LoRa/LoRaWAN, and other wireless communication standards, just to name a few herein.

In some embodiments, functions may be stored as one or more computer-program products, such as instructions or code, in memory 1510, such as RAM, ROM, or Flash and executed by processor(s) 1508.

Memory 1510 may be a non-transitory machine-readable storage medium, processor-readable memory, and/or a computer-readable memory that stores the one or more computer-program products configured to cause the processor(s) 1508 to perform various functions. In other embodiments, various functions described may be performed in hardware.

FIG. 16 provides a block diagram of the beacon device/tag 1600. The beacon device/tag 1600 includes hardware elements that can be electrically coupled via a bus 1606. The beacon device/tag 1600 may further include (and/or be in communication with) one or more non-transitory machine-readable storage mediums or storage devices (e.g., memory 1610), which can comprise, without limitation, local and/or network accessible storage, and/or can include, without limitation, a solid-state storage device such as RAM and/or a ROM, which can be flash-updateable, programmable, and/or the like. Such storage devices may be configured to implement any appropriate data storage, including without limitation, database structures, various file systems, and/or the like.

In one embodiment, the bus 1606 can be used for the processor(s) 1608 to communicate between cores of the processor(s) 1608 and/or with the memory 1610. The hardware elements may include one or more processors 1608 including, without limitation, one or more general-purpose processors or special-purpose processors; one or more I/O devices 1602; and one or more wireless transceivers 1604 able to transmit and/or receive wireless signals 1614. Optionally, I/O device 1602 can include various input devices including, without limitation, a switch, a button, a keypad, an accelerometer sensor, a gyroscope sensor, and/or the like. The beacon device/tag 1600 includes one or more wireless transceivers 1604 connected to the bus 1606. The wireless transceiver 1604 may be operable to transmit and/or receive wireless signals 1614 via antenna 1612. A wireless signal 1614 transmitted by the beacon device/tag 1600 may be a signal compliant with a wireless communication standard. For example, embodiments are contemplated where the wireless communication standard is one or more of Wi-Fi, BLE, NB-IoT, SigFox, LoRa/LoRaWAN, and other low-power wireless communication standards. Power of the beacon device/tag 1600 can be provided by means of batteries, energy harvesters, or mains.

In some embodiments, functions may be stored as one or more computer-program products, such as instructions or code, in memory 1610, such as RAM, ROM, or Flash and executed by processor(s) 1608.

FIG. 17 provides a block diagram of the gateway 1700. The gateway 1700 includes hardware elements that can be electrically coupled via a bus 1706. The gateway 1700 may further include (and/or be in communication with) one or more non-transitory machine-readable storage mediums or storage devices (e.g., memory 1710), which can comprise, without limitation, local and/or network accessible storage, and/or can include, without limitation, a disk drive, a drive array, a solid-state storage device such as RAM and/or a ROM, which can be flash-updateable, programmable, and/or the like. Such storage devices may be configured to implement any appropriate data storage, including without limitation, database structures, various file systems, and/or the like.

In one embodiment, the bus 1706 can be used for the processor(s) 1708 to communicate between cores of the processor(s) 1708 and/or with the memory 1710. The hardware elements may include one or more processors 1708 including, without limitation, one or more general-purpose processors or special-purpose processors; one or more I/O devices 1702; and one or more wireless transceivers 1704 able to transmit and/or receive wireless signals 1714. Optionally, I/O devices 1702 can include various input devices including, without limitation, a camera, a switch, a button, a keypad, a screen, and/or the like. Optionally, I/O device 1702 can include network access devices in addition to wireless transceivers 1704, including, without limitation, an Ethernet network interface module. The gateway 1700 includes one or more wireless transceivers 1704 connected to the bus 1706. The wireless transceiver 1704 may be operable to transmit and/or receive wireless signals 1714 via antenna 1712. A wireless signal 1714 transmitted by gateway 1700 may be a signal compliant with a wireless communication standard. For example, embodiments are contemplated where the wireless communication standard is one or more of Wi-Fi, General Packet Radio Service ("GPRS"), Global System for Mobile communication ("GSM"), UMTS, LTE, BLE, NB-IoT, SigFox, LoRa/LoRaWAN, and other wireless communication standards, just to name a few herein.

In various embodiments, functions may be stored as one or more computer-program products, such as instructions or code, in memory 1710, such as RAM, ROM, or Flash and executed by processor(s) 1708.

FIG. 18 provides a block diagram of the server 1800. The server 900 includes hardware elements that can be electrically coupled via a bus 1806. The server 1800 may further include (and/or be in communication with) one or more non-transitory machine-readable storage mediums or storage devices (e.g., memory 1810), which can comprise, without limitation, local and/or network accessible storage, and/or can include, without limitation, a disk drive, a drive array, an optical storage device, a solid-state storage device such as RAM and/or a ROM, which can be flash-updateable, programmable, and/or the like. Such storage devices may be configured to implement any appropriate data storage, including without limitation, database structures, various file systems, and/or the like.

In one embodiment, the bus 1806 can be used for the processor(s) 1808 to communicate between cores and/or with the memory 1810. The hardware elements may include one or more processors 1808 including, without limitation, one or more general-purpose processors or special-purpose processors; one or more I/O devices 1802; and one or more network interfaces 1804 able to emit and receive wired and/or wireless signals 1814. Optionally, I/O devices 1802 can include various input devices including, without limitation, a keyboard, a keypad, a screen, and/or the like. The server 1800 includes one or more network interfaces 1804 connected to the bus 1806. The network interfaces 1804 may be operable to transmit and/or receive signals 1814 via a cable and/or via antenna 1812. A signal 1814 transmitted by server 1800 may be a signal compliant with a wired communication standard and/or a wireless communication standard. For example, embodiments are contemplated where the wired communication standard is one or more of Ethernet, Optical Transport Network ("OTN"), Programmable Logic Controller ("PLC"), and other wired communication standards, while the wireless communication standard is one or more of Wi-Fi, GPRS/GSM, UMTS, LTE, Bluetooth, BLE, NB-IoT, SigFox, LoRa/LoRaWAN, and other wireless communication standards.

In various embodiments, functions may be stored as one or more computer-program products, such as instructions or code, in memory 1810, such as RAM, ROM, or Flash and executed by processor(s) 1808.

In various embodiments, a server 1800 may be integrated into a gateway 1700 which contains the wired and wireless network access interfaces, a server application endpoint implemented as a program stored in the memory 1810 and may communicate with the beacon device(s)/tag(s) 1600 through other gateways 1700 and/or network devices.

BRIEF DESCRIPTION OF THE DRAWINGS

FIG. 1.1 illustrates an example interaction between multiple beacon devices in the form of a beacon tag or a beacon device module as part of a user device running an exemplary user application, beacon tags, a gateway, and a server as may occur in some embodiments.

FIG. 1.2 illustrates an example navigation view of a user application including a map, current beacon device location, multiple hotspot areas, and history of visited waypoints as may occur in some embodiments

FIG. 10 is a flow diagram illustrating a process for beacon device-initiated interactions between a beacon device (or a user device) and a gateway.

FIG. 11.1 is a flow diagram illustrating a process for updating/storing beacon device's configurations on a server.

FIG. 11.2 is a flow diagram illustrating a process for configuring a beacon device from a server.

FIG. 12 is a flow diagram illustrating a process for initializing or configuring a gateway from a server.

FIG. 13 is a flow diagram illustrating a process for creating a map of a venue for an event with hotspot areas and additional metadata.

FIG. 14.1 is a block diagram of server application services as may occur in some embodiments.

FIG. 14.2 is a block diagram of gateway application data as may occur in some embodiments FIG. 14.3 is a block diagram of beacon application data as may occur in some embodiments.

FIG. 15 illustrates a block diagram of a user device incorporating beacon device modules as I/O devices as may occur in some embodiments.

Figure 2:
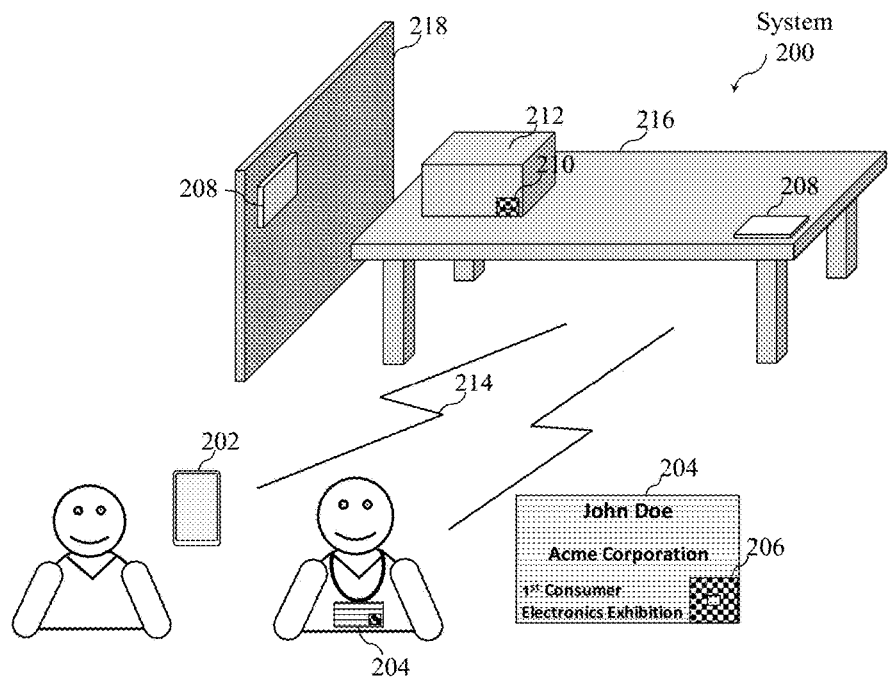
FIG. 2 illustrates a deployment of a system consisting of user devices, a beacon tag on a badge, a beacon tag on an object, and a gateway as may occur in some embodiments.
Figure 3:
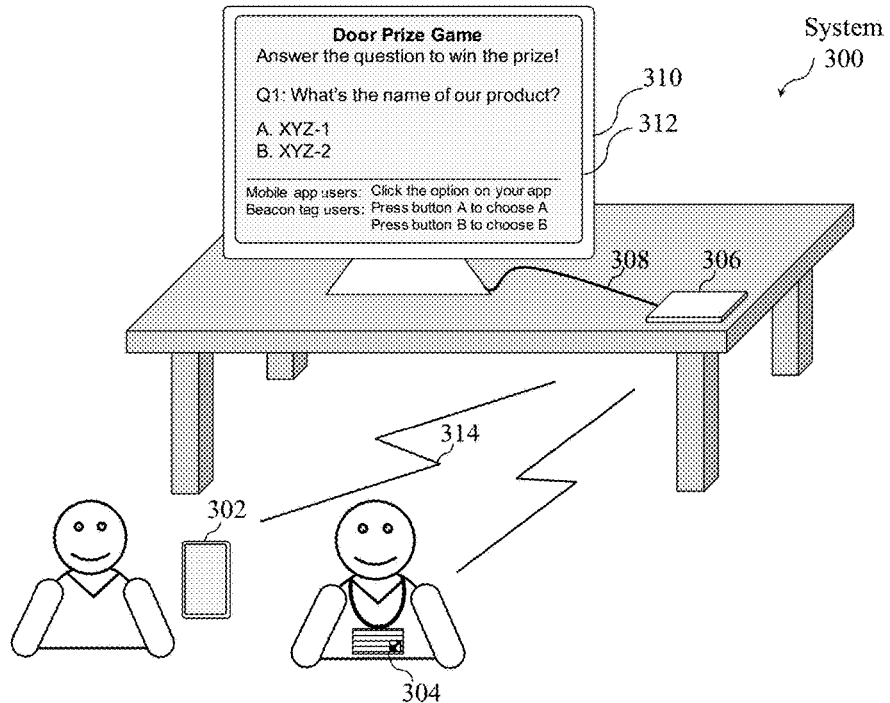
FIG. 3 illustrates a deployment of a system for allowing users using a user device and a beacon tag to participate an interactive application shown on a display through a gateway as may occur in some embodiments.
Figure 4:
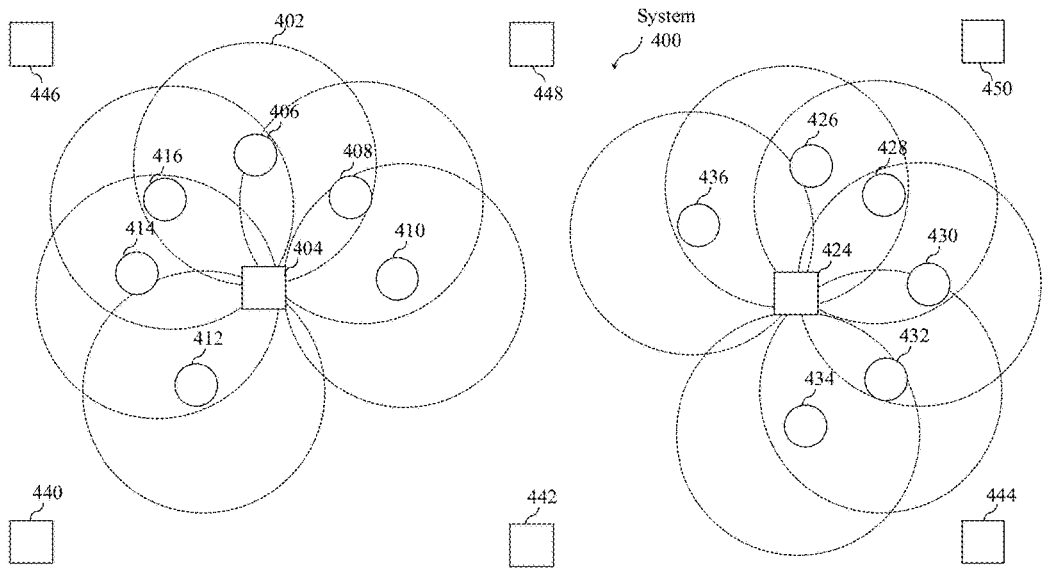
FIG. 4 illustrates a deployment of a system in a computer network as may occur in some embodiments.
Figure 5:
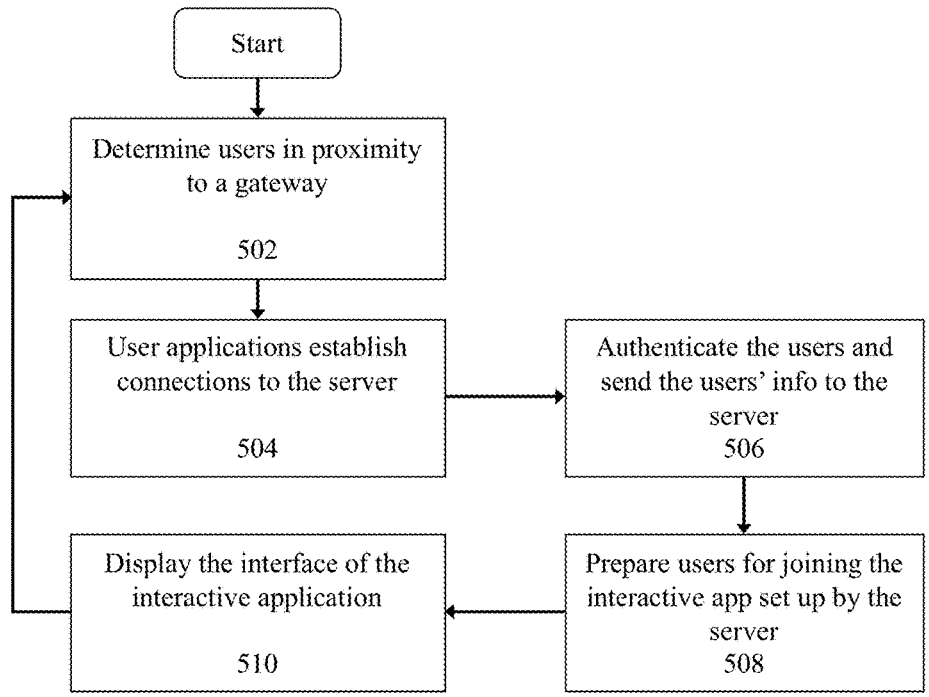
FIG. 5 is a flow diagram illustrating a process for onboarding users into an interactive application to allow users to participate and/or interact with each other.
Figure 6:
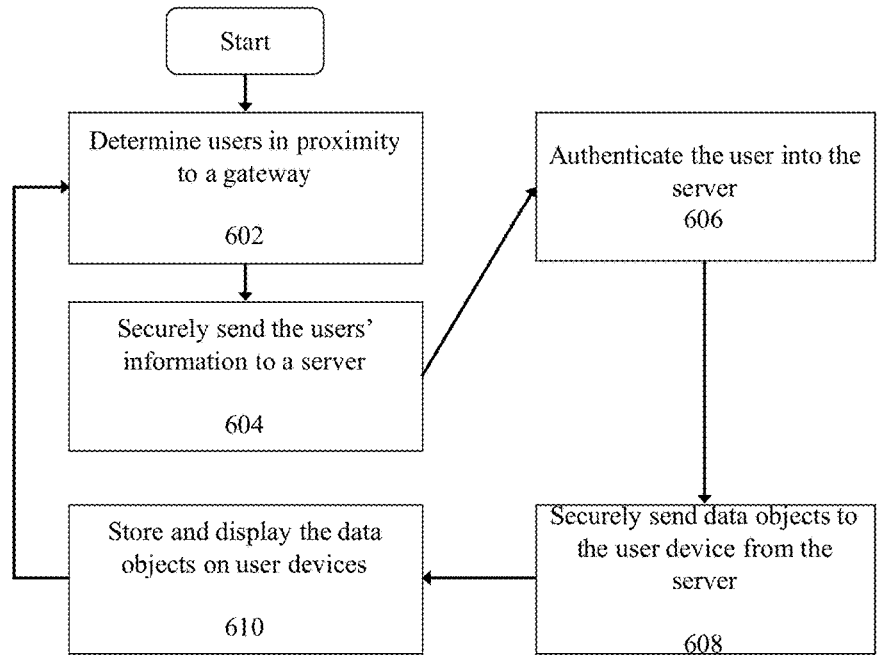
FIG. 6 is a flow diagram illustrating a process for authenticating users and sending data objects to the user device by a server and a gateway as may occur in some embodiments.
Figure 7:
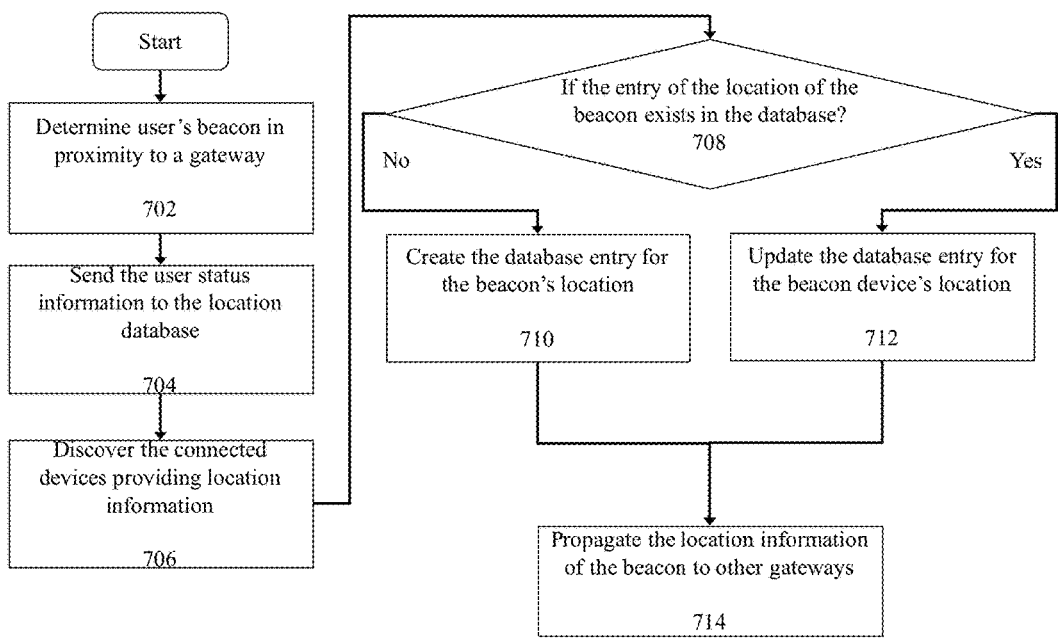
FIG. 7 is a flow diagram illustrating a process for autonomously generating and maintaining the location database for an event or a venue for providing fine-grained location or proximity information for beacon devices.
Figure 8:
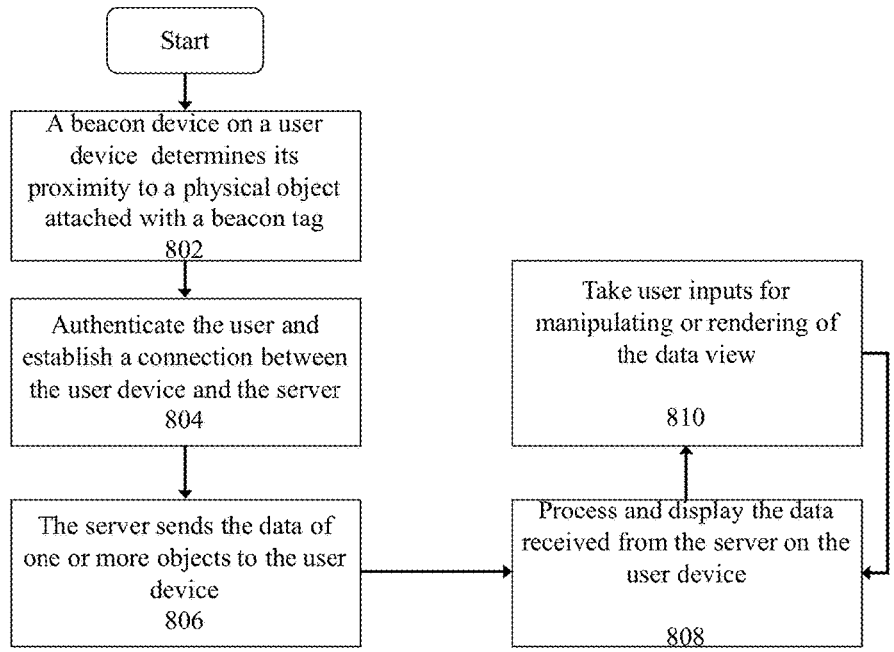
FIG. 8 is a flow diagram illustrating a process for transferring, manipulating, and rendering the data of objects.
Figure 9:
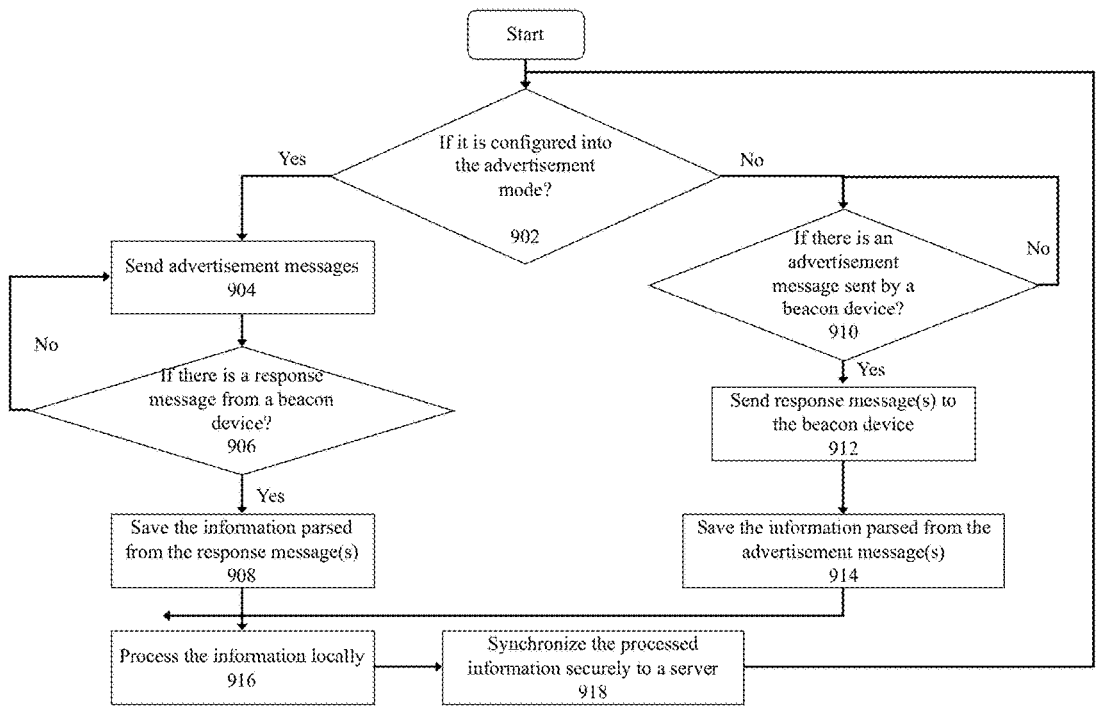
FIG. 9 is a flow diagram illustrating a process for gateway-initiated interactions between a beacon device (or a user device) and a gateway.
Figure 16:
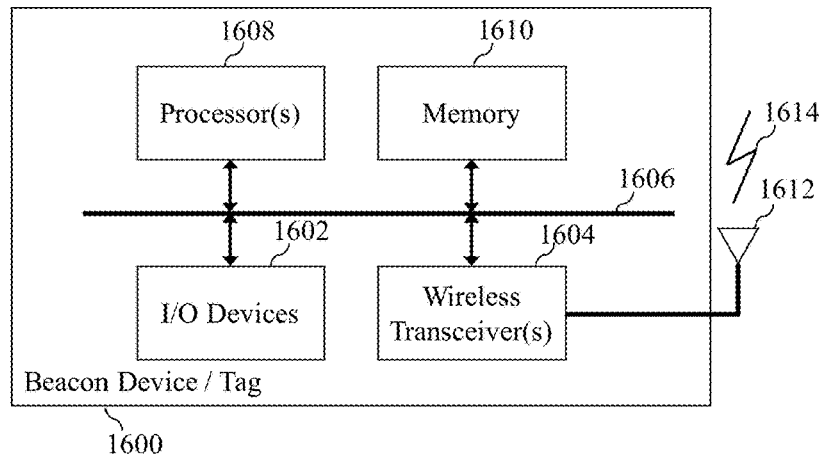
FIG. 16 illustrate a block diagram of a beacon device/tag as may occur in some embodiments.
Figure 17:
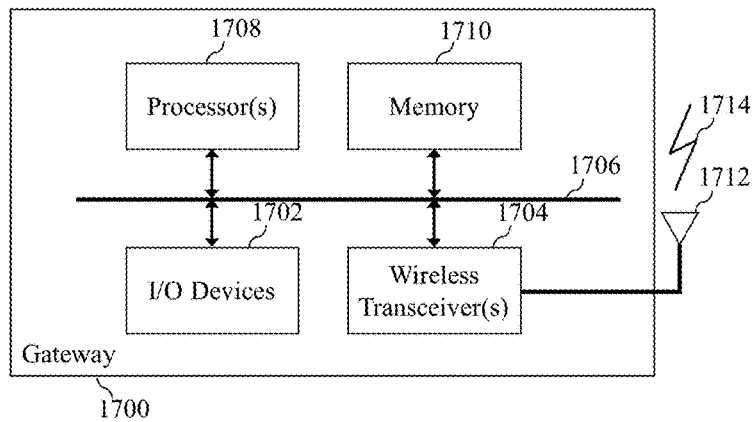
FIG. 17 illustrates a block diagram of a gateway as may occur in some embodiments
Figure 18:
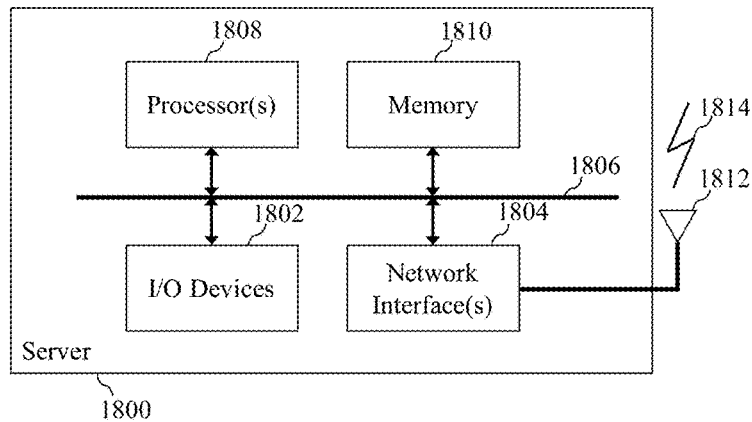
FIG. 18 illustrates a block diagram of a server as may occur in some embodiments The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. However, the intention is not to limit the particular embodiments described. On the contrary, the embodiments are intended to cover all modifications, equivalents, and alternatives falling within the scope of the disclosed embodiments as defined by the appended claims.

The invention claimed is:
1. A method, comprising:
   determining real-time location information of one or a plurality of beacon devices each used by an on-site event attendee in a venue for an event to a gateway used by an event user wherein said event user has a different role of said on-site event attendee when said beacon device connects to or approaches said gateway, wherein the location information is derived from the information from one or more signal strength indications using a wireless transceiver component of said gateway or said beacon device, and is optionally derived from other said gateways when additional accuracy of said location information is required, wherein said additional accuracy of said location information includes obtaining which said gateway is geographically closest when multiple said gateways are in the vicinity of said beacon device, obtaining direction of said beacon device to said gateway, obtaining the distance of said beacon device to said gateway, and obtaining a coordinate of said beacon device to said gateway, and wherein by determining said additional accuracy of said gateway interacts with other said gateways which store at least an entry of said location information of said beacon device, helps measure the signal strength indications to collaboratively determine said location information passively through said signal strength indications or proactively through wireless inquires with other said gateways anchored in the venue for an event and/or external communication devices, or a combination thereof, which are connected to one or more communication networks wherein wireless transceiver interfaces and/or network interfaces of said one or more communication networks are present on said beacon devices, said gateways, and said external communication devices;

discovering and surveying said gateways and said beacon devices for obtaining additional information for providing the location information of one or more said gateways and said beacon devices connected to a communication network with said gateways in a star, tree, or mesh topology, wherein initiating said one beacon device discovers gateways through parsing identification information of wireless messages sent from said gateways and said beacon devices, and surveys other said gateways beyond the immediately connected said gateway from the initiating said beacon device through multi-hop wireless message exchanges for obtaining real-time said one or more beacon devices connected to said gateways, location information of said beacon devices previously connected to said gateways, a list of location information of said gateways for creating global location information associated to said gateways, or a combination thereof, wherein a part or the whole of said location information is configured to be stored in one or a plurality of said gateways in a centralized or distributed manner, and wherein said one or more gateways optionally synchronize said location information to a server;

when said one beacon device connects to or approaches said one gateway, initiating a wireless data communication session between said beacon device and said gateway either by said beacon device or said gateway, wherein, when said wireless data communication session is initiated by said beacon device, said beacon device is set in an advertisement mode and said gateway is set in a non-advertisement mode; when said wireless data communication session is initiated by said gateway, said beacon device is set in a non-advertisement mode and said gateway is set in an advertisement mode, and said beacon device is in a low-power operation mode wherein, before said wireless data communication session occurs, at least one wireless interface of said beacon device is configured to be in a reception only mode, wherein said gateway and said beacon are connected to said wireless communication network and are causing, at least in part, said gateway to initiate identification of said beacon devices, authentication of said beacon devices, authorization of said beacon devices, or a combination thereof;

when said one beacon device connects to or approaches said one gateway, autonomously generating and maintaining a location database for a venue of an event for providing location information for said beacon devices wherein the change of location information of said beacon devices causes dynamic updates of said location database;

when a wireless data communication session is initiated between said beacon device and said gateway, when said one beacon device connects to or approaches said one gateway, or a combination therefore, protecting data integrity and confidentiality of data communications between said beacon device and said gateway, wherein said beacon device and said gateway are configured with security credentials for encrypting and decrypting data or for establishing a secure connection to transfer data;

when a wireless data communication session is initiated between said beacon device and said gateway, when said one beacon device connects to or approaches said one gateway, or a combination therefore, generating and maintaining a list of location history information on said beacon device wherein a part or the whole of said list of said location history information can be configured to be synchronized to said gateway or said server;

when a wireless data communication session is initiated between said beacon device and said gateway, when said one beacon device connects to or approaches said one gateway, or a combination therefore, enhancing real-time user interactions between said event user of said gateway and one or a plurality of on-site said event attendees using said beacon devices or between multiple said on-site event attendees using said beacon devices for providing on-site real-time participation in an interactive application with data transfers and data processing taking user inputs from one or more user input devices connected to said beacon devices for assisting in user interactions including essentially an on-site digital social activity, business, or promotion activity using said interactive application with a display device connected through said gateway in the proximity of said beacon device, wherein said user interactions occur between an application endpoint of said at least one beacon device and another application endpoint of said gateway, and wherein said beacon device is standalone with a built-in connection to said one or more user input devices, or is connected to and operational with external said one or more user input devices; and generating and managing application data through application endpoints on said beacon device, said gateway, said server, or a combination thereof, wherein said application data includes at least location data and security data, wherein the security data includes device identification data and security credentials data and the security data can be obtained through a pre-configuration process and/or through a bootstrapping, initialization, or configuration process using a configuration application service hosted on said gateway or said server;

wherein functionalities of said server is configured to be present on either a standalone said server connected with said gateways, or on said one gateway deployed with said beacon devices on a local network.

2. A method of claim 1, further comprising:

retrieving and processing event related information from wireless messages from said gateway installed in or onto a physical object wherein the wireless messages include the data to identify, or represent, at least in part, the event related information, and wherein the physical object is used to divide a space in a venue for an event, and/or is used to represent and/or showcase a product or service, to display business or promotion information, or a combination thereof.

3. A method of claim 1, further comprising:

when one or a plurality of said beacon devices are determined as approaching at or being in the vicinity of one of said gateways, causing said gateway to immediately respond to said beacon devices with wireless messages sent from said gateway, wherein said wireless messages include plaintext which can be parsed directly by said beacon devices, or wherein said wireless messages include encoded data which can be decoded by said beacon devices using said security data stored in the computer readable medium of said beacon devices;

causing, at least in part, said security data stored in the computer readable medium of said beacon devices for identification, authentication and/or authorization with said gateway and/or said server;

processing wireless messages received from said gateway, wherein the wireless messages include said application data causing one or a plurality of said on-site event attendees using said beacon device to participate in an interactive application, wherein said interactive application allows said on-site event attendees to be authenticated with said security data to log onto a session within a time period by utilizing the results when discovering and surveying said gateways and said beacon devices, and said interactive application is stored, at least in part, in the computer readable medium of said beacon device, said gateway, said server, or a combination thereof;

processing wireless messages sent from said beacon device, wherein the wireless messages include said application data causing said gateway hosting, at least in part, said interactive application to render application data for said interactive application included in or indexed from the wireless messages in various output formats, wherein the output formats are supported via at least one display I/O component on said gateway; and broadcasting wireless messages with additional said application data on said beacon device including event data and/or promotion data wherein said event data and/or said promotion data are stored in the computer readable medium of said beacon device and wherein the wireless messages broadcasted emit from said beacon device are optionally encoded whereby security data on said beacon device is used to decoded.

4. A method of claim 1, further comprising:
causing, at least in part, a configuration of device management settings of one or a plurality of said beacon devices when interacting with said at least one gateway and/or server; and
causing, at least in part, a configuration of device management settings of one or a plurality of said gateways when interacting with said at least one server.

5. A method of claim 1, further comprising:
checking and updating configuration parameters for whether to initiate an advertisement mode of advertising wireless messages to said gateway(s) directionally or omni-directionally;
responding to said gateway by transmitting wireless messages once a wireless message sent by said gateway is received, and parsing and saving information from message(s) received from said beacon device(s) or user device(s), if said beacon device or said user device is not in the advertisement mode;
advertising wireless messages and waiting until the wireless messages are responded by said gateway, and parsing and saving information from messages received from said gateway, if said beacon device or said user device is in the advertisement mode;
processing the information locally on said beacon device or said user device; and
synchronizing the processed information to a server;
wherein said beacon device is included as a part of said user device with one or more user input devices and output devices, and wherein said beacon device is connected to and operational with said user input devices and output devices.

6. A method of claim 1, further comprising:
transferring configuration information from said server to said beacon device or to said gateway for configuration purposes, or preparing one or more said beacon devices for a remote configuration process;
scanning one or more said beacon devices for obtaining the identifiers of said beacon devices;
establishing a secure connection between the configuration application endpoint with the access to one or more said beacon devices and said server;
creating, reading, updating, or deleting said configuration information associated with the identifier(s) of said beacon device(s);
securely synchronizing said configuration information of said beacon device(s) with said server; and
storing said configuration information on said server, and storing said configuration information on said server, or alternatively retrieving the configuration information of said beacon(s) from said server; and sending the configuration parameters to said beacon(s).

7. A method of claim 1, further comprising:
managing location data of one or a plurality of said beacon devices and/or said gateways;
managing map data for events with hotspot areas and/or additional venue information;
managing security data for said beacon devices, said gateways, and servers;
managing lead/user information, including managing collecting, creating, and processing said lead/user information;
managing devices of said beacon devices and said gateways;
managing user data of said events, said gateways, said servers, said beacon devices, and/or said user devices;
managing data of said event and/or said venue;
managing user applications and/or user application data on said servers, said gateways, said beacon devices, and said user devices; and
managing promotion and services data;
wherein said beacon device is included as a part of said user device with one or more user input devices and output devices and wherein said beacon device is connected to be operational with said user input devices and output devices.

8. A method of claim 1, further comprising:
initializing or configuring said gateway or said beacon device from said server;
establishing a secure connection between said gateway or said beacon device and said server;
processing from and sending data to said gateway or said beacon device by said server; and
storing metadata into or synchronizing data with said gateway or said beacon devices.

9. A method of claim 1, further comprising:
processing wireless messages received from said gateway or said beacon device, wherein the wireless messages contain digital information of a text, a encoded message, a video, an audio, or metadata for business or promotion information representing, at least in part, a product demonstration, a service demonstration, a 3D physical object, a promotional material, or an executable application for displaying through a display I/O device connected to said user device, causing a user of said user device to retrieve and/or render said digital information; and
retrieving and transferring said digital information from said server or said gateway via a communication network, wherein said gateway or said server hosts a part or the whole of said digital information.

10. A method of claim 1, further comprising:
retrieving event related information from wireless messages from said gateway installed in or onto a physical object wherein the wireless messages include the data to identify, or represent, at least in part, the event related information, and wherein the physical object is used to divide a space in a venue for an event, and/or is used to represent and/or showcase a product or service, to display business or promotion information, or a combination thereof.

11. An apparatus, comprising:
at least one processor;
at least one wireless transceiver and optionally one network interface; and
at least one memory including computer program code for one or more programs, said at least one memory and the computer program code configured to, with said at least one processor or a plurality of said processors wherein each of said processors is equipped with at least said one memory and said at least one wireless transceiver and/or network interface causing said processors connected to at least one communication network, cause the apparatus to perform at least the following,
determine real-time location information of one or a plurality of beacon devices each used by an on-site event attendee in a venue for an event to a gateway used by an event user wherein said event user has a different role of said on-site event attendee when said beacon device connects to or approaches said gateway, wherein the location information is derived from the information from one or more signal strength indications using a wireless transceiver component of said gateway or said beacon device, and is optionally derived from other said gateways when additional accuracy of said location information is required, wherein said additional accuracy of said location information includes obtaining which said gateway is geographically closest when multiple said gateways are in the vicinity of said beacon device, obtaining direction of said beacon device to said gateway, obtaining the distance of said beacon device to said gateway, and obtaining a coordinate of said beacon device to said gateway, and wherein by determining said additional accuracy of said gateway interacts with other said gateways which store at least an entry of said location information of said beacon device, helps measure the signal strength indications to collaboratively determine said location information passively through said signal strength indications or proactively through wireless inquires with other said gateways anchored in the venue for an event and/or external communication devices, or a combination thereof, which are connected to one or more communication networks wherein wireless transceiver interfaces and/or network interfaces of said one or more communication networks are present on said beacon devices, said gateways, and said external communication devices;
discover and survey said gateways and said beacon devices for obtaining additional information for providing the location information of one or more said gateways and said beacon devices connected to a communication network with said gateways in a star, tree, or mesh topology, wherein initiating said one beacon device discovers gateways through parsing identification information of wireless messages sent from said gateways and said beacon devices, and surveys other said gateways beyond the immediately connected said gateway from the initiating said beacon device through multi-hop wireless message exchanges for obtaining real-time said one or more beacon devices connected to said gateways, location information of said beacon devices previously connected to said gateways, a list of location information of said gateways for creating global location information associated to said gateways, or a combination thereof, wherein a part or the whole of said location information is configured to be stored in one or a plurality of said gateways in a centralized or distributed manner, and wherein said one or more gateways optionally synchronize said location information to a server;
when said one beacon device connects to or approaches said one gateway, initiate a wireless data communication session between said beacon device and said gateway either by said beacon device or said gateway, wherein, when said wireless data communication session is initiated by said beacon device, said beacon device is set in an advertisement mode and said gateway is set in a non-advertisement mode; when said wireless data communication session is initiated by said gateway, said beacon device is set in a non-advertisement mode and said gateway is set in an advertisement mode, and said beacon device is in a low-power operation mode wherein, before said wireless data communication session occurs, at least one wireless interface of said beacon device is configured to be in a reception only mode, wherein said gateway and said beacon are connected to said wireless communication network and are causing, at least in part, said gateway to initiate identification of said beacon devices, authentication of said beacon devices, authorization of said beacon devices, or a combination thereof;
when said one beacon device connects to or approaches said one gateway, autonomously generate and maintain a location database for a venue of an event for providing location information for said beacon devices wherein the change of location information of said beacon devices causes dynamic updates of said location database;
when a wireless data communication session is initiated between said beacon device and said gateway, when said one beacon device connects to or approaches said one gateway, or a combination therefore, protect data integrity and confidentiality of data communications between said beacon device and said gateway, wherein said beacon device and said gateway are configured with security credentials for encrypting and decrypting data or for establishing a secure connection to transfer data;
when a wireless data communication session is initiated between said beacon device and said gateway, when said one beacon device connects to or approaches said one gateway, or a combination therefore, generate and maintain a list of location history information on said beacon device wherein a part or the whole of said list of said location history information can be configured to be synchronized to said gateway or said server;
when a wireless data communication session is initiated between said beacon device and said gateway, when said one beacon device connects to or approaches said one gateway, or a combination therefore, enhance real-time user interactions between said event user of said gateway and one or a plurality of on-site said event attendees using said beacon devices or between multiple said on-site event attendees using said beacon devices for providing on-site real-time participation in an interactive application with data transfers and data processing taking user inputs from one or more user input devices connected to said beacon devices for assisting in user interactions including essentially an on-site digital social activity, business, or promotion activity using said interactive application with a display device connected through said gateway in the proximity of said beacon device, wherein said user interactions occur between an application endpoint of said at least one beacon device and another application endpoint of said gateway, and wherein said beacon device is standalone with a built-in connection to said one or more user input devices, or is connected to and operational with external said one or more user input devices; and generate and manage application data through application endpoints on said beacon device, said gateway, said server, or a combination thereof, wherein said application data includes at least location data and security data, wherein the security data includes device identification data and security credentials data and the security data can be obtained through a pre-configuration process and/or through a boot-strapping, initialization, or configuration process using a configuration application service hosted on said gateway or said server;

wherein functionalities of said server is configured to be present on either a standalone said server connected with said gateways, or on said one gateway deployed with said beacon devices on a local network.

12. An apparatus of claim 11, wherein the apparatus is further caused to:

retrieve and process event related information from wireless messages from said gateway installed in or onto a physical object wherein the wireless messages include the data to identify, or represent, at least in part, the event related information, and wherein the physical object is used to divide a space in a venue for an event, and/or is used to represent and/or showcase a product or service, to display business or promotion information, or a combination thereof.

13. An apparatus of claim 11, wherein the apparatus is further caused to:

when one or a plurality of said beacon devices are determined as approaching at or being in the vicinity of one of said gateways, cause said gateway to immediately respond to said beacon devices with wireless messages sent from said gateway, wherein said wireless messages include plaintext which can be parsed directly by said beacon devices, or wherein said wireless messages include encoded data which can be decoded by said beacon devices using said security data stored in the computer readable medium of said beacon devices;

cause, at least in part, said security data stored in the computer readable medium of said beacon devices for identification, authentication and/or authorization with said gateway and/or said server;

process wireless messages received from said gateway, wherein the wireless messages include said application data causing one or a plurality of said on-site event attendees using said beacon device to participate in an interactive application, wherein said interactive application allows said on-site event attendees to be authenticated with said security data to log onto a session within a time period by utilizing the results when discovering and surveying said gateways and said beacon devices, and said interactive application is stored, at least in part, in the computer readable medium of said beacon device, said gateway, said server, or a combination thereof;

process wireless messages sent from said beacon device, wherein the wireless messages include said application data causing said gateway hosting, at least in part, said interactive application to render application data for said interactive application included in or indexed from the wireless messages in various output formats, wherein the output formats are supported via at least one display I/O component on said gateway; and broadcast wireless messages with additional said application data on said beacon device including event data and/or promotion data wherein said event data and/or said promotion data are stored in the computer readable medium of said beacon device and wherein the wireless messages broadcasted emit from said beacon device are optionally encoded whereby security data on said beacon device is used to decoded.

14. An apparatus of claim 11, wherein the apparatus is further caused to:

cause, at least in part, a configuration of device management settings of one or a plurality of said beacon devices when interacting with said at least one gateway and/or server; and cause, at least in part, a configuration of device management settings of one or a plurality of said gateways when interacting with said at least one server.

15. An apparatus of claim 11, wherein the apparatus is further caused to:

check and update configuration parameters for whether to initiate an advertisement mode of advertising wireless messages to said gateway(s) directionally or omni-directionally;

respond to said gateway by transmitting wireless messages once a wireless message sent by said gateway is received, and parse and save information from message(s) received from said beacon device(s) or user device(s), if said beacon device or said user device is not in the advertisement mode;

advertise wireless messages and wait until the wireless messages are responded by said gateway, and parse and save information from messages received from said gateway, if said beacon device or said user device is in the advertisement mode;

process the information locally on said beacon device or said user device; and synchronize the processed information to a server;

wherein said beacon device is included as a part of said user device with one or more user input devices and output devices, and wherein said beacon device is connected to and operational with said user input devices and output devices.

16. An apparatus of claim 11, wherein the apparatus is further caused to:

transfer configuration information from said server to said beacon device or to said gateway for configuration purposes, or preparing one or more said beacon devices for a remote configuration process;

scan one or more said beacon devices for obtaining the identifiers of said beacon devices;

establish a secure connection between the configuration application endpoint with the access to one or more said beacon devices and said server;

create, read, update, or delete said configuration information associated with the identifier(s) of said beacon device(s);

securely synchronize said configuration information of said beacon device(s) with said server; and store said configuration information on said server, and store said configuration information on said server, or alternatively retrieve the configuration information of said beacon(s) from said server; and send the configuration parameters to said beacon(s).

17. An apparatus of claim 11, wherein the apparatus is further caused to:

manage location data of one or a plurality of said beacon devices and/or said gateways;

manage map data for events with hotspot areas and/or additional venue information;

manage security data for said beacon devices, said gateways, and servers;

manage lead/user information, including managing collecting, creating, and processing said lead/user information;

manage devices of said beacon devices and said gateways;

manage user data of said events, said gateways, said servers, said beacon devices, and/or said user devices;

manage data of said event and/or said venue;

manage user applications and/or user application data on said servers, said gateways, said beacon devices, and said user devices; and manage promotion and services data;

wherein said beacon device is included as a part of said user device with one or more user input devices and output devices and wherein said beacon device is connected to be operational with said user input devices and output devices.

18. An apparatus of claim 11, wherein the apparatus is further caused to:

initialize or configure said gateway or said beacon device from said server;

establish a secure connection between said gateway or said beacon device and said server;

process from and sending data to said gateway or said beacon device by said server; and store metadata into or synchronizing data with said gateway or said beacon devices.

19. An apparatus of claim 11, wherein the apparatus is further caused to:

process wireless messages received from said gateway or said beacon device, wherein the wireless messages contain digital information of a text, a encoded message, a video, an audio, or metadata for business or promotion information representing, at least in part, a product demonstration, a service demonstration, a 3D physical object, a promotional material, or an executable application for displaying through a display I/O device connected to said user device, causing a user of said user device to retrieve and/or render said digital information; and retrieve and transfer said digital information from said server or said gateway via a communication network, wherein said gateway or said server hosts a part or the whole of said digital information.

20. An apparatus of claim 11, wherein the apparatus is further caused to:

retrieve and process event related information from wireless messages from said gateway installed in or onto a physical object wherein the wireless messages include the data to identify, or represent, at least in part, the event related information, and wherein the physical object is used to divide a space in a venue for an event, and/or is used to represent and/or showcase a product or service, to display business or promotion information, or a combination thereof.

* * * * *